(12) United States Patent
Hung et al.

(10) Patent No.: US 11,439,979 B2
(45) Date of Patent: Sep. 13, 2022

(54) METHOD OF MAKING COLLOIDAL SELENIUM NANOPARTICLES

(71) Applicant: Tripod Nano Technology Corporation, Taoyuan (TW)

(72) Inventors: Chung-Jung Hung, Taoyuan (TW);
Chun-Lun Chiu, Taoyuan (TW);
Chia-Chi Chang, Taoyuan (TW);
Hsin-Chang Huang, Taoyuan (TW);
Teng-Chieh Hsu, Taoyuan (TW);
Meng-Hsiu Chih, Taoyuan (TW);
Jim-Min Fang, Taipei (TW)

(73) Assignee: TRIPOD NANO TECHNOLOGY CORPORATION, Taoyuan (TW)

( * ) Notice: Subject to any disclaimer, the term of this patent is extended or adjusted under 35 U.S.C. 154(b) by 33 days.

(21) Appl. No.: 16/937,443

(22) Filed: Jul. 23, 2020

(65) Prior Publication Data

US 2021/0394157 A1 Dec. 23, 2021

(30) Foreign Application Priority Data

Jun. 23, 2020 (TW) .................................. 109121408

(51) Int. Cl.
*C01B 19/00* (2006.01)
*B01J 20/30* (2006.01)
*B01J 20/02* (2006.01)
*H01L 35/16* (2006.01)

(52) U.S. Cl.
CPC ....... *B01J 20/3078* (2013.01); *B01J 20/0262* (2013.01); *B01J 20/3085* (2013.01)

(58) Field of Classification Search
None
See application file for complete search history.

(56) References Cited

U.S. PATENT DOCUMENTS

| 4,710,442 | A | * | 12/1987 | Koelling | ............ | G03G 5/08207 |
| | | | | | | 430/128 |
| 9,624,237 | B2 | * | 4/2017 | Pi | ............................ | A61P 17/00 |
| 9,776,864 | B2 | | 10/2017 | Bravo et al. | | |
| 2016/0137501 | A1 | | 5/2016 | Bravo et al. | | |
| 2019/0193048 | A1 | | 6/2019 | Abbas et al. | | |

FOREIGN PATENT DOCUMENTS

| CN | 1789113 | A | | 6/2006 |
| CN | 202161911 | | * | 6/2011 |
| CN | 104807999 | | | 7/2015 |
| CN | 109037617 | | | 12/2018 |
| CN | 110526222 | A | | 12/2019 |
| TW | 201904658 | A | | 2/2019 |
| WO | 2017066453 | A1 | | 4/2017 |

OTHER PUBLICATIONS

Machine Translation of CN 202161911 (2012). (Year: 2012).*
Mees, Davis, et al. "Formationo f Selenium Colloids . . . ". Journal of Colloid and Interface Science. 170, 254-260 (1995). (Year: 1995).*
Gates, Byron, et al. "A Solution-Phase Approach . . . " J. Am Chem. Soc. 122, 12582-12583 (2000). (Year: 2000).*
Lin, Zong-Hong, et al. "Evidence on the size-dependent absorption . . . ". Materials Chemistry and Physics. 92, 591-594 (2005) (Year: 2005).*
Machine Translation of CN 202161911 (2012). (Year: 2012) (Year: 2012).*
Shubhangi Shirsat et al. Selenium Nanostructures: Microbial Synthesis and Applications. Oct. 9, 2015.
Bozena Hosnedlova et al., Nano selenium and Its Nanomedicine Applications: A Critical Review. Apr. 10, 2018.
M Quintana et al. Synthesis of selenium nanoparticles by pulsed laser ablation, Jul. 15, 2002.
O. Van Overschelde et al. Green synthesis of selenium nanoparticles by excimer pulsed laser ablation in water. Oct. 16, 2013.
Yongsoon Shin et al. Synthesis and stabilization of selenium nanoparticles on cellulose nanocrystal, Feb. 6, 2007.
Sheng Yi Zhang et al. Synthesis of selenium nanoparticles in the presence of polysaccharides. Jun. 11, 2004.
Sudip Nath et al. Synthesis of Selenium Nanoparticle and its Photocatalytic Application for Decolorization of Methylene Blue under UV Irradiation. Jul. 30, 2004.
Zong Hong Lin et al. Evidence on the size-dependent absorption spectral evolution of selenium nanoparticles. Aug. 15, 2005.
L.B. Yang et al. Synthesis of Se nanoparticles by using TSA ion and its photocatalytic application for decolorization of cango red under UV irradiation. Apr. 13, 2007.
Mengtao Yang et al. Synthesis of selenium nanoparticles in the presence of oyster polysaccharides and the antioxidant activity. Feb. 6, 2014.
Zhizeng Wang et al. Synthesis of Selenium Nanoparticles Suitable for Melamine Detection Using Test Strips. Aug. 1, 2015.
Tianqi Nie et al. Facial synthesis of highly uniform selenium nanoparticles using glucose as reductant and surface decorator to induce cancer cell apoptosis Feb. 23, 2016.

(Continued)

*Primary Examiner* — Sheng H Davis
(74) *Attorney, Agent, or Firm* — Sinorica LLC

(57) ABSTRACT

Provided is a method of making colloidal selenium nanoparticles. The method includes the steps as follows: Step (A): providing a reducing agent and an aqueous solution containing a selenium precursor; Step (B): mixing the aqueous solution containing the selenium precursor and the reducing agent to form a mixture solution in a reaction vessel and heating the mixture solution to undergo a reduction reaction and produce a composition containing selenium nanoparticles, residues and a gas, and guiding the gas out of the reaction vessel, wherein an amount of the residues is less than 20% by volume of the mixture solution; and Step (C): dispersing the selenium nanoparticles with a medium to obtain the colloidal selenium nanoparticles. The method has advantages of simplicity, safety, time-effectiveness, cost-effectiveness, high yield and eco-friendliness.

11 Claims, 12 Drawing Sheets

(56) References Cited

OTHER PUBLICATIONS

Yuntao Liu et al. Synthesis and antidiabetic activity of selenium nanoparticles in the presence of polysaccharides from Catathelasma ventricosum. Mar. 27, 2018.
Abdolrasoul Rangrazi et al. Synthesis and antibacterial activity of colloidal selenium nanoparticles in chitosan solution: a new antibacterial agent. Jan. 24, 2020.
Helga Fernandez Llamosas et al. Speeding up bioproduction of selenium nanoparticles by using Vibrio natriegens as microbial factory. Nov. 22, 2017.
Hammad Alam et al. Synthesis and Characterization of Nano Selenium Using Plant Biomolecules and Their Potential Applications. Nov. 1, 2018.
Venkatesan Alagesan et al. Green Synthesis of Selenium Nanoparticle Using Leaves Extract of Withania somnifera and Its Biological Applications and Photocatalytic Activities. Nov. 3, 2018.
Chen, H. et al., "Green synthesis and characterization of Se nanoparticles and nanorods", Dec. 2011; Electronic Materials Letters, vol. 7, No. 4, pp. 333 336.

* cited by examiner

METHOD OF MAKING COLLOIDAL SELENIUM NANOPARTICLES

CROSS-REFERENCE TO RELATED APPLICATION

Pursuant to 35 U.S.C. § 119(a), this application claims the benefit of the priority to Taiwan Patent Application No. 109121408, filed on Jun. 23, 2020. The content of the prior application is incorporated herein by its entirety.

BACKGROUND OF THE INVENTION

1. Field of the Invention

The present disclosure relates to a method of making colloidal nanoparticles, and particularly to a method of making colloidal selenium nanoparticles.

2. Description of the Prior Arts

Selenium is a mineral in nature and an essential trace element for the human body, so it is often added in multivitamins products and other dietary supplements. Nano-selenium can be absorbed and utilized by the human body, and not only can it work as an antioxidant and an immune regulator, which have been deemed as the specific properties of organic selenium and inorganic selenium, but it also has advantages of low toxicity and high biological activity. In addition, nano-selenium can also be used to resist and reduce the toxic effects of various heavy metals. For example, it can form insoluble substances with silver, mercury, lead or other metals, thereby having a positive effect on the body's resistance to metal pollution in the environment. Thus, nano-selenium has raised more and more attention.

In recent years, scientists have been actively developing various methods to produce selenium nanoparticles. The methods for making selenium nanoparticles can be divided into three major categories: (1) physical methods, (2) chemical methods, and (3) biosynthesis methods. The physical methods break down a bulk material to nano-scale particles by high energy forces, which can be, for example, a pulsed laser ablation, a physical vapor deposition (PVD), a milling method, and the like. The chemical methods obtain nanoparticles through various chemical reactions, which can be, for example, a sol-gel process, a hydrothermal synthesis including a chemical reaction performed in a high-pressure reactor, a reduction-oxidation reaction, and the like. The biosynthesis methods usually use microorganisms or plants to reduce selenate or selenite to selenium nanoparticles. For example, the metabolic system of *Pseudomonas* can reduce selenium-containing compounds or selenites to selenium nanoparticles. Although the biosynthesis methods are advantageous because they are environmental friendly, the selenium nanoparticles formed by different microorganisms or plants have different sizes, which will affect the quality of the final nanoselenium product; besides, a microbial synthesis requires a longer cell growth period which is not in line with economic benefits.

Having large specific surface areas, high chemical activities and metalloid characteristics, selenium nanoparticles are easily oxidated and agglomerated. Thus, the process of preparing selenium nanoparticles usually has to be carried out under a specific atmosphere such as nitrogen atmosphere, or with the introduction of a variety of stabilizers such as modifiers or capping agents during the process in order to control the size, shape, distribution, dispersion and stability of selenium nanoparticles. However, even though the addition of these stabilizers improve the stability and quality of the final products containing selenium nanoparticles, it will make the methods for making selenium nanoparticles more complicated, and may hinder the activity of selenium nanoparticles or limit their application fields.

To overcome the above problems, some methods have been provided. US Patent Publication 2016/0137501 discloses a method for making selenium nanoparticles, including two consecutive steps: liquid phase preparation and spray drying. First, a thermal decomposable reducing amino acid is added in a reaction tank, and a pH value of an aqueous solution containing the reducing amino acid is controlled during the heating process. After the temperature and pH value of the aqueous solution are stable, the selenite is added to the reaction tank to carry out a reaction; after the completion of the reaction, the resulting solution in the reaction tank is then transferred to a spray tower and then a spray drying step is performed to obtain selenium nanoparticles. Although this method can be adopted to produce selenium nanoparticles in various sizes, the steps are cumbersome and the choices of reducing agent must be limited.

US Patent Publication 2019/0193048 discloses a method of preparing a selenium nanomaterial. In this method, a sponge, a film, a nonwoven fabric, a fabric, or a metal-organic framework (MOF) is used as a substrate, and the surfaces of the substrate are coated with saccharide. The surface coated with saccharide is treated with an aqueous solution of selenous acid and an aqueous solution of a reducing agent and then heated to form a selenium nanomaterial bound to the surface thereof. Although this method does not need to use a stabilizer, it requires a specific substrate, which may cause restrictions on subsequent applications.

The above-mentioned conventional methods cannot make colloidal selenium nanoparticles conveniently and efficiently, and they may have many shortcomings such as the need of expensive equipment or specific reagents, high energy consumption, incomplete reaction and the inability to recover or reuse unreacted selenium-containing raw materials, long reaction time, poor stability, and the harm to the environment. As a result, said methods in the prior art are not conducive to a mass production, thereby having a low potential for industrial implementation.

SUMMARY OF THE INVENTION

In view that the conventional methods have technical defects, an objective of the instant disclosure is to provide a method of making colloidal selenium nanoparticles, wherein the method does not require any expensive equipment, thereby being beneficial for mass production and having a high potential for commercial implementation.

Another objective of the instant disclosure is to provide a method of making colloidal selenium nanoparticles which has advantages of low energy consumption and environmental friendliness.

Another objective of the instant disclosure is to provide a method of making colloidal selenium nanoparticles which has advantages of simplicity and safety.

Another objective of the instant disclosure is to provide a method of making colloidal selenium nanoparticles which has advantages of improving yield and increasing cost-effectiveness.

To achieve the foresaid objectives, the instant disclosure provides a method of making colloidal selenium nanoparticles, which includes Steps (A) to (C). In Step (A), a reducing agent and an aqueous solution containing a selenium precursor are provided. In Step (B), the aqueous solution containing the selenium precursor and the reducing agent in a reaction vessel are mixed to form a mixture solution, and the mixture solution is heated to undergo a reduction reaction and produce a composition containing selenium nanoparticles, residues and a gas, and the gas is guided out of the reaction vessel, wherein an amount of the residues is less than 20% by volume of the mixture solution. In Step (C), the selenium nanoparticles are dispersed with a medium to obtain the colloidal selenium nanoparticles.

By means of heating the mixture solution and guiding the gas produced from the reduction reaction out of the reaction vessel, the reduction reaction can proceed more completely, and then the yield can be improved. Furthermore, limiting the volume of the mixture solution in the reaction vessel can increase the concentrations of the reactants and enhance collision probability of reactant molecules in the reaction vessel, so that the reaction rate can be accelerated. During the formation of selenium nanoparticles, since water of the aqueous solution is vaporized and reduced to less than 20% of the volume of the original mixture solution, the reduction reaction step and the dispersion step will not proceed at the same time. Therefore, the reducing agents and dispersing agents can be independently selected from a wide range of choices without any restriction. Accordingly, the instant disclosure is suitable for commercial implementations.

In certain embodiments, Step (A) may comprise Steps (a1) and (a2). In Step (a1), a selenium powder is treated with an aqueous solution containing an oxidant to provide the aqueous solution containing the selenium precursor. In Step (a2), the reducing agent is provided.

In accordance with the instant disclosure, there are no specific limitations to the oxidant. As long as the oxidant can dissolve the selenium powder to form the aqueous solution containing the selenium precursor, said oxidant is suitable for Step (a1). Preferably, in order to reduce impurities such as heavy metals, the oxidant may be selected from the group consisting of: a halogen oxoacid (referred to as $HXO_n$), a halogen oxoacid salt (referred to as $MXO_n$) and a combination thereof. Said halogen (X) of the oxidant is Cl or Br; M is Na or K; and n is an integer 1, 2, 3 or 4.

In certain embodiments, the halogen oxoacid may be hypochlorous acid (HClO), chlorous acid ($HClO_2$), chloric acid ($HClO_3$), perchloric acid ($HClO_4$), hypobromous acid (HBrO), bromous acid ($HBrO_2$), bromic acid ($HBrO_3$), or any combination thereof, but it is not limited thereto. In certain embodiments, the halogen oxoacid salt may be sodium hypochlorite (NaClO), potassium hypochlorite (KClO), sodium chlorite ($NaClO_2$), potassium chlorite ($KClO_2$), sodium chlorate ($NaClO_3$), potassium chlorate ($HClO_3$), sodium perchlorate ($NaClO_4$), potassium perchlorate ($HClO_4$), sodium hypobromite (NaBrO), potassium hypobromite (KBrO), sodium bromite ($NaBrO_2$), potassium bromite ($KBrO_2$), sodium bromate ($NaBrO_3$), potassium bromate ($KBrO_3$), or any combination thereof, but it is not limited thereto.

Preferably, the aqueous solution containing the oxidant further includes a hydrohalic acid, whereby the selenium powder and the oxidant will react more thoroughly. For example, the hydrohalic acid may be hydrofluoric acid (HF), hydrochloric acid (HCl), or hydrobromic acid (HBr). More preferably, when the oxidant is the halogen oxoacid or the halogen oxoacid salt, the species of the halogen of the halogen oxoacid or the halogen oxoacid salt is the same as that of the halogen of the hydrohalogen acid.

Preferably, a molar ratio of the oxidant relative to the selenium powder ranges from 1.5:1 to 15:1.

Preferably, an average particle size of the selenium powder of Step (a1) is on a scale of micrometres (i.e. 1 μm to 100 μm), but it is not limited thereto. In addition, the instant disclosure can directly use the foresaid micro-sized selenium powder as a raw material and sequentially undergo three consecutive individual steps in the order below: dissolution of selenium powder, production of selenium nanoparticles, and colloidization of selenium nanoparticles in a same reaction vessel. Thus, the method of the instant disclosure not only retains the advantages of low loss and high recovery of a one-pot reaction, but also separates the processes of nanonization and colloidization, thereby reducing the difficulty in finding the optimal combination of reagents. It can simplify the process and increase the flexibility of choices of reagents and ensure product diversities.

In accordance with the instant disclosure, the selenium precursor of the aqueous solution comprises a selenium halide, a selenium ion, a selenous acid ($H_2SeO_3$), a selenite ion ($SeO_3^{2-}$), a selenate ion ($SeO_4^{2-}$) or a selenosulfate ion ($SeSO_3^{2-}$), but it is not limited thereto.

Specifically, the selenium halide may be represented as $Se_mX_n$, wherein X is F, Cl or Br; m is an integer 1 or 2; and n is an integer 1, 2, 3 or 4. Preferably, the selenium halide may be selenium difluoride ($SeF_2$), selenium dichloride ($SeCl_2$), selenium dibromide ($SeBr_2$), diselenium dichloride ($Se_2Cl_2$), diselenium dibromide ($Se_2Br_2$), selenium tetrafluoride ($SeF_4$), or selenium tetrachloride ($SeCl_4$).

Specifically, the selenium ion may be derived from the selenium halide, but it is not limited thereto.

The selenite ion may be derived from sodium selenite ($Na_2SeO_3$), the selenous acid, or potassium selenite ($K_2SeO_3$), but it is not limited thereto.

The selenate ion may be derived from sodium selenate ($Na_2SeO_4$) or potassium selenate ($K_2SeO_4$), but it is not limited thereto.

The selenosulfate ion may be derived from sodium selenosulfate ($Na_2SeSO_3$), but it is not limited thereto.

Accordingly, the aqueous solution containing the selenium precursor may contain some ions besides the selenium precursor, such as halogen ions or alkali metal cations, but it is not limited thereto.

Preferably, a molar concentration of the selenium precursor of the aqueous solution ranges from 0.05 M to 3.0 M. More preferably, the molar concentration of the selenium precursor of the aqueous solution ranges from 0.08 M to 1.0 M. Even more preferably, the molar concentration of the selenium precursor of the aqueous solution ranges from 0.1 M to 0.3 M.

In accordance with the instant disclosure, there are no specific limitations to the reducing agent. As long as the reducing agent can reduce the selenium precursor to produce the selenium nanoparticles, said reducing agent is suitable for the instant disclosure. The reducing agent may comprise a first reducing agent or a second reducing agent, but it is not limited thereto.

The first reducing agent is selected from the group consisting of: citric acid, lactic acid, glycolic acid, ascorbic acid, oxalic acid, tartaric acid, 1,4-butanediol, glycerol, acetaldehyde, monosaccharide, disaccharide and any combination thereof. For example, the monosaccharide may be glucose, but it is not limited thereto. The disaccharide may be lactose or maltose, but it is not limited thereto.

The second reducing agent is selected from the group consisting of: poly(ethylene glycol), polyvinylpyrrolidone (PVP), polysaccharide and any combination thereof. For example, the polysaccharide may be chitosan or chitin, but it is not limited thereto.

In Step (B), a time required for the reduction reaction is influenced by the kinds of the reducing agent and the molar concentrations of each reactant; in which the reaction time ranges from 5 minutes to 80 minutes. Preferably, the reaction time ranges from 6 minutes to 30 minutes.

In addition, the reaction rate of the reduction reaction can be adjusted by a combined use of the reducing agents to give selenium nanoparticles in various sizes in order to meet the size requirements of the final products. For example, the reducing agent may be a combination of glucose and citric acid or a combination of citric acid and polyvinylpyrrolidone, but it is not limited thereto. In the case that the reducing agent is the combination of glucose and citric acid, the resulting selenium nanoparticles have an average particle size ranging from 100 nm to 110 nm. In the case that the reducing agent is the combination of citric acid and polyvinylpyrrolidone, the resulting selenium nanoparticles have an average particle size ranging from 80 nm to 90 nm.

In certain embodiments, a molar ratio of the first reducing agent relative to the selenium precursor ranges from 1 to 50. Preferably, the molar ratio of the first reducing agent relative to the selenium precursor ranges from 5 to 30. More preferably, the molar ratio of the first reducing agent relative to the selenium precursor ranges from 10 to 20.

In other certain embodiments, provided that the molar concentration of the selenium precursor of the aqueous solution ranges from 0.05 M to 3.0 M, the weight of the second reducing agent ranges from 10 mg to 1000 mg, but it is not limited thereto. Preferably, the weight of the second reducing agent ranges from 30 mg to 500 mg. More preferably, the weight of the second reducing agent ranges from 50 mg to 300 mg.

When the gas produced from the reduction reaction in step (B) is acidic such as gaseous HCl, preferably, the gas is trapped by water, which may reduce and reuse the acid wastes. Accordingly, the step can reduce the cost of wastewater treatment and the cost of purchasing acidic reagents; moreover, the process is environment-friendly.

In accordance with the instant disclosure, the medium in Step (C) for dispersing the selenium nanoparticles may be water or an aqueous solution including a dispersing agent.

Specifically, said dispersing agent may comprise citric acid, lactic acid, poly(lactic acid) (also known as PLA), ascorbic acid, tannic acid, malic acid, sodium hydroxide, polyarginine, lysine, glutamic acid, asparagine, oleylamine, ethylene glycol, glycerol, glucose, maltose, maltitol, water-soluble chitosan, polyvinylpyrrolidone, polyvinyl alcohol (PVA), poly(ethylene glycol), or any combination thereof.

Preferably, a weight-average molecular weight (Mw) of poly(lactic acid) ranges from 5,000 to 15,000, but it is not limited thereto; an Mw of polyarginine ranges from 5,000 to 15,000, but it is not limited thereto; an Mw of PVP ranges from 3,000 to 13,000, but it is not limited thereto; an Mw of chitosan ranges from 90,000 to 110,000, but it is not limited thereto; an Mw of PVA ranges from 40,000 to 50,000, but it is not limited thereto; an Mw of poly(ethylene glycol) ranges from 8,000 to 18,000, but it is not limited thereto. Preferably, the medium in Step (C) may be water or the aqueous solution including said dispersing agent which comprises citric acid, glucose, oleylamine, poly(ethylene glycol), glycerol, or chitosan.

Preferably, a molar concentration of the dispersing agent ranges from 0.001 M to 1.0 M. More preferably, the molar concentration of the dispersing agent ranges from 0.01 M to 0.5 M.

Preferably, a molar ratio of the dispersing agent relative to the selenium nanoparticles ranges from 0.1 to 100. More preferably, the molar ratio of the dispersing agent relative to the selenium nanoparticles ranges from 1 to 20.

In accordance with the instant disclosure, all the water used in the aqueous solution is distilled water. More preferably, the water is deionized water.

In accordance with the instant disclosure, there are no specific limitations to the temperatures in Steps (A) to (C), as long as each step can be carried out, the concerned temperatures can be applied to the instant disclosure. Nevertheless, the reaction rate is also influenced by the temperature, so the reactions will proceed more uniformly and may generate less bubbles with a proper temperature control, thereby enhancing the quality of the resulting selenium nanoparticles.

Preferably, a temperature in Step (a1) ranges from 4° C. to 100° C. More preferably, the temperature in Step (a1) ranges from 10° C. to 70° C.

Preferably, a heating temperature in Step (B) ranges from 50° C. to 200° C. More preferably, the heating temperature in Step (B) ranges from 70° C. to 160° C.

Preferably, a dispersion temperature in Step (C) ranges from 20° C. to 100° C. More preferably, the dispersion temperature in Step (C) ranges from 50° C. to 80° C.

In the reduction reaction of Step (B) and the dispersion of Step (C), when the aqueous environment mainly contains organic reducing agents and organic dispersing agents and does not contain excessive inorganic cations, the resulting colloidal selenium nanoparticles attain a good stability.

In addition, since the gases produced from the reduction reaction is guided out of the reaction vessel in Step (B), said colloidal selenium nanoparticles will avoid the interference of anions such as $Cl^-$, thereby improving the stability of the resulting colloidal selenium nanoparticles.

In accordance with the instant disclosure, in the ultraviolet-visible (UV-Vis) absorption spectroscopy, the wavelength of maximum absorption ($\lambda_{max}$) may be influenced by the kinds of the dispersing agent and the particle sizes of the selenium nanoparticles. Generally, the $\lambda_{max}$ of the selenium nanoparticles ranges from 280 nm to 295 nm. Since an absorption value at $\lambda_{max}$ may not significantly be affected by the dispersion medium, the absorption value can reflect the concentration of the selenium nanoparticles.

In accordance with the instant disclosure, the size of the colloidal selenium nanoparticles can be characterized by transmission electron microscopy (TEM) imaging. The average particle size of the selenium nanoparticles ranges from 75 nm to 120 nm.

In accordance with the instant disclosure, the colloidal selenium nanoparticles show high zeta potential, which is a key indicator of the stability of colloidal dispersion. Preferably, an absolute value of the zeta potential of the colloidal selenium nanoparticles is equal to or more than 30 mV.

The colloidal selenium nanoparticles can be used in various fields such as care products, rapid screening tests and antibacterial products, but it is not limited thereto.

In this specification, the term "residue" or "residues" in Step (B) means the remaining solution containing unevaporated water and a few unreacted materials (if any) in the same reaction vessel, such as the selenium precursor and the reducing agent.

In this specification, where a range of values is provided, it is understood that each intervening value, between the upper and lower limits of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Other objectives, advantages and novel features of the disclosure will become more apparent from the following detailed description when taken in conjunction with the accompanying drawings.

DETAILED DESCRIPTION OF THE PREFERRED EMBODIMENTS

Hereinafter, one skilled in the arts can easily realize the advantages and effects of the instant disclosure from the following examples. Therefore, it should be understood that the descriptions proposed herein are just preferable examples for the purpose of illustrations only, not intended to limit the scope of the disclosure. Various modifications and variations could be made in order to practice or apply the instant disclosure without departing from the spirit and scope of the disclosure.

Process of Making Colloidal Selenium Nanoparticles

Figure 1:
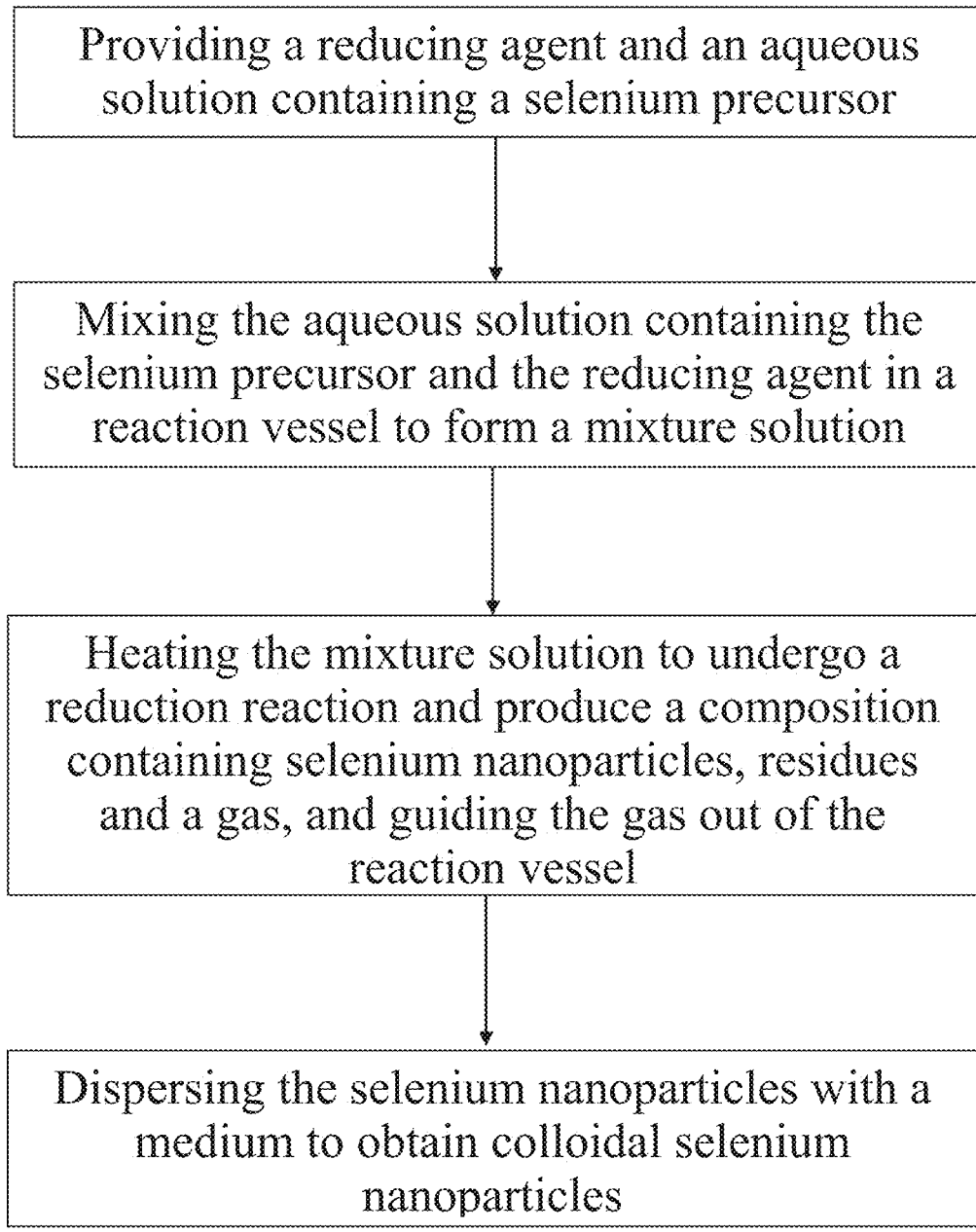
FIG. 1 is a schematic flow diagram illustrating a method for making colloidal selenium nanoparticles in accordance with the instant disclosure.

All the reagents were reagent grade and used as purchased from Acros Organics without further purification. The water was distilled or deionized. Each Example was performed according to the method shown in FIG. 1.

Instruments:
1. Inductively coupled plasma atomic emission spectroscopy (ICP-OES): Agilent 5100 manufactured by Agilent Technologies;
2. Ultraviolet-visible (UV-Vis) spectrophotometer: Cary60 manufactured by Agilent Technologies;
3. Zeta-potential & particle size analyzer: ELSZ-2000ZS manufactured by Otsuka Tech Electronics Co., Ltd.;
4. Field Emission Transmission Electron Microscope (FE-TEM): Tecnai G2 F20 S-TWIN manufactured by FEI Company;
5. Thermogravimetric Analyzer (TGA): TGA/DSC1 Star System manufactured by Mettler Toledo.

Comparative Example 1: Hydrothermal Synthesis

First, $Na_2SeO_3$ (8.65 g, 50 mmol) and glucose (18 g, 100 mmol) and 100 mL of water were added into a 250 mL flat-bottomed flask and stirred homogeneously to form a reaction mixture. Then, the flat-bottomed flask was placed in an autoclave at a pressure of $1.17 \times 10^5$ Pa and heated to 115° C. for 15 minutes, so that $Na_2SeO_3$ underwent a reduction reaction to produce selenium nanoparticles and the color of the resulting solution changed from colorless to red.

Comparative Example 2: Reduction Under a Closed Reflux System

First, $H_2SeO_3$ (6.45 g, 50 mmol) and glucose (18 g, 100 mmol) and 100 mL of water were added into a 250 mL flat-bottomed flask and stirred homogeneously to form a reaction mixture. Subsequently, the flat-bottomed flask was connected to a condenser tube to be set as a closed reflux system. While the flat-bottomed flask was heated to 115° C. for 30 minutes to perform a reduction reaction, the condenser was continuously fed with 4° C. water. After a completion of the reduction reaction, selenium nanoparticles were produced in the resulting solution and the color of the resulting solution changed from colorless to red.

Example 1

In Step (A), selenium dioxide ($SeO_2$) and water were used to prepare 0.65 mL of 0.1 M $H_2SeO_{3(aq)}$ (0.065 mmol). In addition, 234 mg of glucose (1.3 mmol) and 62.4 mg of citric acid (0.32 mmol) were taken out for use.

In Step (B), the aforementioned $H_2SeO_{3(aq)}$, glucose and citric acid were added into a 100 mL two-neck flat-bottomed flask to form a mixture solution. Subsequently, the flat-bottomed flask was placed on a hot plate and heated at 150° C. for 8 minutes to perform a reduction reaction. The reduction reaction produced a composition containing selenium nanoparticles, residues and water vapor; and the amount of the residues was less than 15% by volume of the above-mentioned mixture solution. During the reduction reaction, the water vapor produced therefrom was guided out through the recovery port attached to the flat-bottomed flask, and was trapped with 10 mL of water in an Erlenmeyer flask for collection.

In Step (C), 50 mL of water as the medium was added into the flat-bottomed flask to disperse the selenium nanoparticles in the flat-bottomed flask, and said solution was heated at 65° C. for 10 minutes to obtain colloidal selenium nanoparticles.

Example 2

The method used for making colloidal selenium nanoparticles of Example 2 was similar to the method used for making colloidal selenium nanoparticles of Example 1. The differences between the methods were that, in Example 2, 234 mg of glucose and 124.8 mg of citric acid (0.65 mmol) were used as the reducing agents of Step (A) and the heating was performed at 150° C. for 7.5 minutes in Step (B).

Example 3

The method used for making colloidal selenium nanoparticles of Example 3 was similar to the method used for making colloidal selenium nanoparticles of Example 1. The difference between the methods was that, in Example 3, 234 mg of glucose and 100 mg of PVP (Mw: 3,500) were used as the reducing agents of Step (A).

Example 4

In Step (A), $SeO_2$ and water were used to prepare 0.65 mL of 0.1 M $H_2SeO_{3(aq)}$ (0.065 mmol). In addition, 58 mg of glucose (0.32 mmol) was taken out for use.

In Step (B), the aforementioned $H_2SeO_{3(aq)}$ and glucose were added into a 100 mL two-neck flat-bottomed flask to form a mixture solution. Subsequently, the flat-bottomed flask was placed on a hot plate and heated at 150° C. for 9 minutes to perform a reduction reaction. The reduction reaction produced a composition containing selenium nanoparticles, residues and water vapor; and the amount of the residues was less than 15% by volume of the above-mentioned mixture solution. During the reduction reaction, the water vapor produced therefrom was guided out through the recovery port attached to the flat-bottomed flask, and was trapped with 10 mL of water in an Erlenmeyer flask for collection.

In Step (C), 50 mL of an aqueous solution including oleylamine (50 mg, 0.19 mmol) as the medium was added into the flat-bottomed flask to disperse the selenium nanoparticles in the flat-bottomed flask, and said solution was heated at 65° C. for 10 minutes to obtain colloidal selenium nanoparticles.

Example 5

The method used for making colloidal selenium nanoparticles of Example 5 was similar to the method used for making colloidal selenium nanoparticles of Example 4. The differences between the methods were that, in Example 5, 234 mg of glucose (1.30 mmol) was taken as the reducing agents of Step (A), the heating at 150° C. for 8 minutes in Step (B), and the medium of Step (C) was 50 mL of an aqueous solution including lactic acid (400 mg, 4.44 mmol).

Example 6

The method used for making colloidal selenium nanoparticles of Example 6 was similar to the method used for making colloidal selenium nanoparticles of Example 4. The differences between the methods were that, in Example 6, 234 mg of glucose (1.30 mmol) was taken as the reducing agents of Step (A), and the medium of Step (C) was 50 mL of an aqueous solution including 40 mg of chitosan and 1200 mg of citric acid (6.25 mmol). Wherein, the Mw of chitosan was from 10,000 to 13,000.

Example 7

The method used for making colloidal selenium nanoparticles of Example 7 was similar to the method used for making colloidal selenium nanoparticles of Example 6. The difference between the methods was that, in Example 7, the medium of Step (C) was 50 mL of an aqueous solution including 50 mg of poly(ethylene glycol). Wherein, the Mw of poly(ethylene glycol) was 10,000.

Example 8

In Step (A), $SeCl_4$ was dissolved in water to prepare 0.65 mL of a 0.1 M aqueous solution containing a selenium precursor (0.065 mmol). In addition, 234 mg of glucose (1.30 mmol) was taken out for use.

In Step (B), the aforementioned aqueous solution containing the selenium precursor and glucose were added into a 100 mL two-neck flat-bottomed flask to form a mixture solution. Subsequently, the flat-bottomed flask was placed on a hot plate and heated at 150° C. for 9 minutes to perform a reduction reaction. The reduction reaction produced a composition containing selenium nanoparticles, residues and gaseous HCl; and the amount of the residues was less than 15% by volume of the above-mentioned mixture solution. During the reduction reaction, the gaseous HCl produced therefrom was guided out through the recovery port attached to the flat-bottomed flask, and was trapped with 10 mL of water in an Erlenmeyer flask for collection.

In Step (C), 50 mL of an aqueous solution including PVP as the medium was added into the flat-bottomed flask to disperse the selenium nanoparticles in the flat-bottomed flask, and said solution was heated at 65° C. for 10 minutes to obtain colloidal selenium nanoparticles. Wherein, the weight of PVP was 50 mg and the Mw of PVP was 3,500.

Example 9

The method used for making colloidal selenium nanoparticles of Example 9 was similar to the method used for making colloidal selenium nanoparticles of Example 8. The difference between the methods was that, in Example 9, the medium of Step (C) was 50 mL of an aqueous solution including 50 mg of citric acid (0.26 mmol).

Example 10

The method used for making colloidal selenium nanoparticles of Example 10 was similar to the method used for making colloidal selenium nanoparticles of Example 8. The differences between the methods were that, in Example 10, 351 mg of glucose (1.95 mmol) was taken as the reducing agents of Step (A), the heating was performed at 150° C. for 6.3 minutes in Step (B), and the medium of Step (C) was 50 mL of water.

Example 11

The method used for making colloidal selenium nanoparticles of Example 11 was similar to the method used for making colloidal selenium nanoparticles of Example 8. The differences between the methods were that, in Example 11, the heating was performed at 150° C. for 11.3 minutes in Step (B), and the medium of Step (C) was 50 mL of an aqueous solution including 100 mg of glycerol (1.09 mmol).

Example 12

The method used for making colloidal selenium nanoparticles of Example 12 was similar to the method used for making colloidal selenium nanoparticles of Example 8. The differences between the methods were that, in Example 12, 234 mg of glucose and 50 mg of PVP with an Mw of 3,500 were taken as the reducing agents of Step (A), and the medium of Step (C) was 50 mL of water.

Example 13

The method used for making colloidal selenium nanoparticles of Example 13 was similar to the method used for making colloidal selenium nanoparticles of Example 4. The differences between the methods were that, in Example 13, 234 mg of glucose (1.30 mmol) was taken as the reducing agents of Step (A), the heating was performed at 150° C. for 10.2 minutes in Step (B), and the medium of Step (C) was 50 mL of an aqueous solution including 50 mg of ascorbic acid (0.28 mmol).

Example 14

The method used for making colloidal selenium nanoparticles of Example 14 was similar to the method used for making colloidal selenium nanoparticles of Example 4. The differences between the methods were that, in Example 14, 250 mg of citric acid (1.30 mmol) was taken as the reducing agents of Step (A), the heating was performed at 150° C. for 13.3 minutes in Step (B), and the medium of Step (C) was 50 mL of an aqueous solution including 100 mg of asparagine (0.76 mmol).

Example 15

The method used for making colloidal selenium nanoparticles of Example 15 was similar to the method used for making colloidal selenium nanoparticles of Example 1. The differences between the methods were that, in Example 15, 499 mg of citric acid (2.60 mmol) was taken as the reducing agents of Step (A), and the heating was performed at 150° C. for 15 minutes in Step (B).

Example 16

The method used for making colloidal selenium nanoparticles of Example 16 was similar to the method used for making colloidal selenium nanoparticles of Example 8. The differences between the methods were that, in Example 16, 117 mg of glucose was taken as the reducing agents of Step (A), the heating was performed at 130° C. for 12.5 minutes in Step (B), and the medium of Step (C) was 50 mL of an aqueous solution including 100 mg of lysine (0.68 mmol).

Example 17

In Step (A), $Na_2SeO_3$ was dissolved in water to prepare 0.65 mL of a 0.1 M aqueous solution containing a selenium precursor (0.065 mmol). In addition, 117 mg of glucose (0.65 mmol) was taken out for use.

In Step (B), the aforementioned aqueous solution containing the selenium precursor and glucose were added into a 100 mL two-neck flat-bottomed flask to form a mixture solution. Subsequently, the flat-bottomed flask was placed on a hot plate and heated at 150° C. for 8.5 minutes to perform a reduction reaction. The reduction reaction produced a composition containing selenium nanoparticles, residues and water vapor; and the amount of the residues was less than 15% by volume of the above-mentioned mixture solution. During the reduction reaction, the water vapor produced therefrom was guided out through the recovery port attached to the flat-bottomed flask, and was trapped with 10 mL of water in an Erlenmeyer flask for collection.

In Step (C), 50 mL of an aqueous solution including polyarginine as the medium was added into the flat-bottomed flask to disperse the selenium nanoparticles in the flat-bottomed flask, and said solution was heated at 65° C. for 10 minutes to obtain colloidal selenium nanoparticles. Wherein, the weight of polyarginine was 50 mg and the Mw of polyarginine was 7,500.

Example 18

The method used for making colloidal selenium nanoparticles of Example 18 was similar to the method used for making colloidal selenium nanoparticles of Example 17. The differences between the methods were that, in Example 18, 234 mg of glucose (1.30 mmol) and 62.4 mg of citric acid (0.32 mmol) were taken as the reducing agents of Step (A), the heating was performed at 150° C. for 8 minutes in Step (B), and the medium of Step (C) was 50 mL of water.

Example 19

The method used for making colloidal selenium nanoparticles of Example 19 was similar to the method used for making colloidal selenium nanoparticles of Example 18. The differences between the methods were that, in Example 19, 234 mg of glucose (1.30 mmol) and 124.8 mg of citric acid (0.65 mmol) were taken as the reducing agents of Step (A), and the heating was performed at 150° C. for 7.5 minutes in Step (B).

Example 20

The method used for making colloidal selenium nanoparticles of Example 20 was similar to the method used for making colloidal selenium nanoparticles of Example 8. The differences between the methods were that, in Example 20, 234 mg of glucose (1.30 mmol) and 100 mg of PVP with an Mw of 3,500 were taken as the reducing agents of Step (A), the heating was performed at 150° C. for 8 minutes in Step (B), and the medium of Step (C) was 50 mL of water.

Example 21

The method used for making colloidal selenium nanoparticles of Example 21 was similar to the method used for making colloidal selenium nanoparticles of Example 8. The differences between the methods were that, in Example 21, the heating was performed at 130° C. for 11.5 minutes in Step (B), and the medium of Step (C) was 50 mL of an aqueous solution including NaOH (40 mg, 1.0 mmol).

Example 22

The method used for making colloidal selenium nanoparticles of Example 22 was similar to the method used for making colloidal selenium nanoparticles of Example 8. The differences between the methods were that, in Example 22, 234 mg of glycerol (2.54 mmol) was taken as the reducing agents of Step (A), the heating was performed at 150° C. for 11.3 minutes in Step (B), and the medium of Step (C) was 50 mL of water.

Example 23

The method used for making colloidal selenium nanoparticles of Example 23 was similar to the method used for making colloidal selenium nanoparticles of Example 8. The differences between the methods were that, in Example 23, 117 mg of glucose (0.65 mmol) was taken as the reducing agents of Step (A), the heating was performed at 150° C. for 10.2 minutes in Step (B), and the medium of Step (C) was 50 mL of an aqueous solution including maltose (50 mg, 0.146 mmol).

Example 24

In Step (A), $SeO_2$ and water were used to prepare 3.25 mL of 0.1 M $H_2SeO_{3(aq)}$ (0.325 mmol). In addition, 295 mg of glucose (1.64 mmol) was taken out for use.

In Step (B), the aforementioned $H_2SeO_{3(aq)}$ and glucose were added into a 100 mL two-neck flat-bottomed flask to form a mixture solution. Subsequently, the flat-bottomed flask was placed on a hot plate and heated at 150° C. for 26.1 minutes to perform a reduction reaction. The reduction reaction produced a composition containing selenium nanoparticles, residues and water vapor; and the amount of the residues was less than 15% by volume of the above-mentioned mixture solution. During the reduction reaction, the water vapor produced therefrom was guided out through the recovery port attached to the flat-bottomed flask, and was trapped with 10 mL of water in an Erlenmeyer flask for collection.

In Step (C), 50 mL of an aqueous solution including glucose (295 mg, 1.64 mmol) as the medium was added into the flat-bottomed flask to disperse the selenium nanoparticles in the flat-bottomed flask, and said solution was heated at 70° C. for 10 minutes to obtain colloidal selenium nanoparticles.

Example 25

The method used for making colloidal selenium nanoparticles of Example 25 was similar to the method used for making colloidal selenium nanoparticles of Example 24. The differences between the methods were that, in Example 25, the heating was performed at 150° C. for 24.6 minutes in Step (B), and the medium of Step (C) was 50 mL of an aqueous solution including maltose (117 mg, 0.34 mmol).

Example 26

The method used for making colloidal selenium nanoparticles of Example 26 was similar to the method used for making colloidal selenium nanoparticles of Example 24. The differences between the methods were that, in Example 26, the heating was performed at 150° C. for 28.4 minutes in Step (B), and the medium of Step (C) was 50 mL of an aqueous solution including tannic acid (117 mg, 0.069 mmol).

Example 27

The method used for making colloidal selenium nanoparticles of Example 27 was similar to the method used for making colloidal selenium nanoparticles of Example 8. The differences between the methods were that, in Example 27, the heating was performed at 150° C. for 10 minutes in Step (B), and the medium of Step (C) was 50 mL of an aqueous solution including 40 mg of polyvinyl alcohol with an Mw of 41,000.

Example 28

The method used for making colloidal selenium nanoparticles of Example 28 was similar to the method used for making colloidal selenium nanoparticles of Example 8. The differences between the methods were that, in Example 28, the heating was performed at 150° C. for 9.8 minutes in Step (B), and the medium of Step (C) was 50 mL of an aqueous solution including 30 mg of PVP and 30 mg of polyvinyl alcohol. Wherein, PVP has an Mw of 8,000 and polyvinyl alcohol had an Mw of 41,000

Example 29

The method used for making colloidal selenium nanoparticles of Example 29 was similar to the method used for making colloidal selenium nanoparticles of Example 8. The differences between the methods were that, in Example 29, the heating was performed at 150° C. for 10.1 minutes in Step (B), and the medium of Step (C) was 50 mL of an aqueous solution including 160 mg of ascorbic acid (0.896 mmol).

Example 30

In Step (A), 0.65 mL of 0.1 M selenic acid ($H_2SeO_4$, 0.065 mmol) was prepared. In addition, 499 mg of citric acid (2.60 mmol) and 50 mg of PVP with an Mw of 3,500 were taken out for use.

In Step (B), the aforementioned $H_2SeO_{4(aq)}$, citric acid and PVP were added into a 100 mL two-neck flat-bottomed flask to form a mixture solution. Subsequently, the flat-bottomed flask was placed on a hot plate and heated at 150° C. for 11.8 minutes to perform a reduction reaction. The reduction reaction produced a composition containing selenium nanoparticles, residues and water vapor; and the amount of the residues was less than 15% by volume of the above-mentioned mixture solution. During the reduction reaction, the water vapor produced therefrom was guided out through the recovery port attached to the flat-bottomed flask, and was trapped with 10 mL of water in an Erlenmeyer flask for collection.

In Step (C), 50 mL of water as the medium was added into the flat-bottomed flask to disperse the selenium nanoparticles in the flat-bottomed flask, and said solution was heated at 70° C. for 10 minutes to obtain colloidal selenium nanoparticles.

Example 31

The method used for making colloidal selenium nanoparticles of Example 31 was similar to the method used for making colloidal selenium nanoparticles of Example 30. The differences between the methods were that, in Example 31, 499 mg of citric acid (2.60 mmol) and 100 mg of PVP with an Mw of 3,500 were taken as the reducing agents of Step (A) and the heating was performed at 150° C. for 11.4 minutes in Step (B).

Example 32

In Step (A), $Na_2SeO_4$ was dissolved in water to prepare 0.65 mL of 0.1 M aqueous solution containing a selenium precursor (0.065 mmol). In addition, 250 mg of citric acid (1.3 mmol) and 50 mg of PVP with an Mw of 3,500 were taken out for use.

In Step (B), the aforementioned aqueous solution containing the selenium precursor, citric acid and PVP were added into a 100 mL two-neck flat-bottomed flask to form a mixture solution. Subsequently, the flat-bottomed flask was placed on a hot plate and heated at 150° C. for 13 minutes to perform a reduction reaction. The reduction reaction produced a composition containing selenium nanoparticles, residues and water vapor; and the amount of the residues was less than 15% by volume of the above-mentioned mixture solution. During the reduction reaction, the water vapor produced therefrom was guided out through the recovery port attached to the flat-bottomed flask, and was trapped with 10 mL of water in an Erlenmeyer flask for collection.

In Step (C), 50 mL of water as the medium was added into the flat-bottomed flask to disperse the selenium nanoparticles in the flat-bottomed flask, and said solution was heated at 70° C. for 10 minutes to obtain colloidal selenium nanoparticles.

Example 33

The method used for making colloidal selenium nanoparticles of Example 33 was similar to the method used for making colloidal selenium nanoparticles of Example 32. The differences between the methods were that, in Example 33, 250 mg of citric acid (1.3 mmol) and 100 mg of PVP with an Mw of 3,500 were taken as the reducing agents of Step (A) and the heating was performed at 150° C. for 13.1 minutes in Step (B).

Example 34

In Step (A), 0.0975 mmol of $SeCl_4$ was dissolved in water to prepare 0.975 mL of a 0.1 M aqueous solution containing a selenium precursor. In addition, 380 mg of citric acid (1.97 mmol) was taken out for use.

In Step (B), the aforementioned aqueous solution containing the selenium precursor and citric acid were added into a 100 mL two-neck flat-bottomed flask to form a mixture solution. Subsequently, the flat-bottomed flask was placed on a hot plate and heated at 150° C. for 18.1 minutes to perform a reduction reaction. The reduction reaction produced a composition containing selenium nanoparticles, residues and gaseous HCl; and the amount of the residues was less than 15% by volume of the above-mentioned mixture solution. During the reduction reaction, the gaseous HCl produced therefrom was guided out through the recovery port attached to the flat-bottomed flask, and was trapped with 10 mL of water in an Erlenmeyer flask for collection.

In Step (C), 50 mL of an aqueous solution including 100 mg of glutamic acid (0.68 mmol) as the medium was added into the flat-bottomed flask to disperse the selenium nanoparticles in the flat-bottomed flask, and said solution was heated at 70° C. for 10 minutes to obtain colloidal selenium nanoparticles.

Example 35

In Step (A), 0.325 mmol of $SeCl_4$ was dissolved in water to prepare 3.25 mL of a 0.1 M aqueous solution containing a selenium precursor. In addition, 500 mg of citric acid (2.60 mmol) was taken out for use.

In Step (B), the aforementioned aqueous solution containing the selenium precursor and citric acid were added into a 100 mL two-neck flat-bottomed flask to form a mixture solution. Subsequently, the flat-bottomed flask was placed on a hot plate and heated at 150° C. for 31.5 minutes to perform a reduction reaction. The reduction reaction produced a composition containing selenium nanoparticles, residues and gaseous HCl; and the amount of the residues was less than 15% by volume of the above-mentioned mixture solution. During the reduction reaction, the gaseous HCl produced therefrom was guided out through the recovery port attached to the flat-bottomed flask, and was trapped with 10 mL of water in an Erlenmeyer flask for collection.

In Step (C), 50 mL of water as the medium was added into the flat-bottomed flask to disperse the selenium nanoparticles in the flat-bottomed flask, and said solution was heated at 70° C. for 30 minutes to obtain colloidal selenium nanoparticles.

Example 36

The method used for making colloidal selenium nanoparticles of Example 36 was similar to the method used for making colloidal selenium nanoparticles of Example 1. The differences between the methods were that, in Example 36, 234 mg of glucose and 100 mg of poly(ethylene glycol) with an Mw of 10,000 were taken as the reducing agents of Step (A), the heating was performed at 150° C. for 9.8 minutes in Step (B), and the heating was performed at 70° C. for 10 minutes in Step (C).

Example 37

The method used for making colloidal selenium nanoparticles of Example 37 was similar to the method used for making colloidal selenium nanoparticles of Example 36. The differences between the methods were that, in Example 37, 234 mg of glucose (1.30 mmol) and 200 mg of poly(ethylene glycol) with an Mw of 10,000 were taken as the reducing agents of Step (A), and the heating was performed at 150° C. for 10 minutes in Step (B).

Example 38

The method used for making colloidal selenium nanoparticles of Example 38 was similar to the method used for making colloidal selenium nanoparticles of Example 36. The differences between the methods were that, in Example 38, 234 mg of glucose (1.30 mmol) and 300 mg of poly(ethylene glycol) with an Mw of 10,000 were taken as the reducing agents of Step (A), and the heating was performed at 150° C. for 9.4 minutes in Step (B).

Example 39

The method used for making colloidal selenium nanoparticles of Example 39 was similar to the method used for making colloidal selenium nanoparticles of Example 8. The differences between the methods were that, in Example 39, the heating was performed at 150° C. for 11 minutes in Step (B), and the medium of Step (C) was 50 mL of an aqueous solution including 130 mg of maltitol (0.378 mmol) and the heating was performed at 70° C. for 10 minutes in Step (C).

Example 40

The method used for making colloidal selenium nanoparticles of Example 40 was similar to the method used for making colloidal selenium nanoparticles of Example 39. The differences between the methods were that, in Example 40, the heating was performed at 150° C. for 10.7 minutes in Step (B), and the medium of Step (C) was 50 mL of an aqueous solution including 117 mg of malic acid (0.873 mmol).

Example 41

The method used for making colloidal selenium nanoparticles of Example 41 was similar to the method used for making colloidal selenium nanoparticles of Example 39. The differences between the methods were that, in Example 41, the heating was performed at 150° C. for 13.5 minutes in Step (B), and the medium of Step (C) was 50 mL of water.

Example 42

In Step (a1), 10 mg of selenium powder (0.126 mmol) and 1 mL of concentrated $HCl_{(aq)}$ were added into a 10 mL two-neck flat-bottomed flask, wherein the selenium powder had an average particle size of 75 μm and the concentrated HCl was 36 wt %. Subsequently, 1 mL of an aqueous solution containing 70 mg of $NaClO_2$ (0.77 mmol) was added into the flat-bottomed flask, and then the resulting solution was stirred for 20 minutes at 40° C. until the selenium powder was dissolved thoroughly to prepare an aqueous solution containing a selenium precursor. In Step (a2), 351 mg of glucose (1.95 mmol) was taken out for use.

In Step (B), the aforementioned glucose was added into the flat-bottomed flask and mixed with the aqueous solution containing the selenium precursor to form a mixture solution. Subsequently, the flat-bottomed flask was placed on a hot plate and heated at 150° C. for 35 minutes to perform a reduction reaction. The reduction reaction produced a composition containing selenium nanoparticles, residues and gaseous HCl; and the amount of the residues was less than 15% by volume of the above-mentioned mixture solution. During the reduction reaction, the gaseous HCl produced therefrom was guided out through the recovery port attached to the flat-bottomed flask, and was trapped with 10 mL of water in an Erlenmeyer flask for collection.

In Step (C), 50 mL of water as the medium was added into the flat-bottomed flask to disperse the selenium nanoparticles in the flat-bottomed flask, and said solution was heated at 70° C. for 10 minutes to obtain colloidal selenium nanoparticles.

Example 43

In Step (a1), 20 mg of selenium powder (0.252 mmol) and 1 mL of concentrated $HCl_{(aq)}$ were added into a 10 mL two-neck flat-bottomed flask, wherein the selenium powder had an average particle size of 75 μm and the concentrated HCl was 36 wt %. Subsequently, 1 mL of an aqueous solution containing oxidants was added into the flat-bottomed flask, and then the resulting solution was stirred for 20 minutes at 40° C. until the selenium powder was dissolved thoroughly to prepare an aqueous solution containing a selenium precursor. The oxidants were 20 mg of $NaClO_2$ (0.22 mmol) and 60 mg of $NaClO_3$ (0.57 mmol). In Step (a2), 702 mg of glucose (3.90 mmol) was taken out for use.

In Step (B), the aforementioned glucose was added into the flat-bottomed flask and mixed with the aqueous solution containing the selenium precursor to form a mixture solution. Subsequently, the flat-bottomed flask was placed on a hot plate and heated at 150° C. for 42 minutes to perform a reduction reaction. The reduction reaction produced a composition containing selenium nanoparticles, residues and gaseous HCl; and the amount of the residues was less than 15% by volume of the above-mentioned mixture solution. During the reduction reaction, the gaseous HCl produced therefrom was guided out through the recovery port attached to the flat-bottomed flask, and was trapped with 10 mL of water in an Erlenmeyer flask for collection.

In Step (C), 50 mL of an aqueous solution including 50 mg of citric acid (0.26 mmol) as the medium was added into the flat-bottomed flask to disperse the selenium nanoparticles in the flat-bottomed flask, and said solution was heated at 70° C. for 10 minutes to obtain a crude product; then, the pH value of the crude product was adjusted to 12 with 0.5 mL of 0.56 M $NaOH_{(aq)}$ (0.28 mmol), so as to obtain colloidal selenium nanoparticles.

Example 44

In Step (a1), 20 mg of selenium powder (0.252 mmol) and 1 mL of concentrated $HCl_{(aq)}$ were added into a 10 mL two-neck flat-bottomed flask, wherein the selenium powder had an average particle size of 75 μm and the concentrated HCl was 36 wt %. Subsequently, 1 mL of an aqueous solution containing oxidants was added into the flat-bottomed flask, and then the resulting solution was stirred for 20 minutes at 40° C. until the selenium powder was dissolved thoroughly to prepare an aqueous solution containing a selenium precursor. The oxidants were 70 mg of $HClO_3$ (0.57 mmol) and 20 mg of $HClO_4$ (0.14 mmol). In Step (a2), 702 mg of citric acid (3.66 mmol) was taken out for use.

In Step (B), the aforementioned citric acid was added into the flat-bottomed flask and mixed with the aqueous solution containing the selenium precursor to form a mixture solution. Subsequently, the flat-bottomed flask was placed on a hot plate and heated at 150° C. for 42 minutes to perform a reduction reaction. The reduction reaction produced a composition containing selenium nanoparticles, residues and gaseous HCl; and the amount of the residues was less than 15% by volume of the above-mentioned mixture solution. During the reduction reaction, the gaseous HCl produced therefrom was guided out through the recovery port attached to the flat-bottomed flask, and was trapped with 10 mL of water in an Erlenmeyer flask for collection.

In Step (C), 50 mL of water as the medium was added into the flat-bottomed flask to disperse the selenium nanoparticles in the flat-bottomed flask, and said solution was heated at 70° C. for 10 minutes to obtain a crude product; then, the pH value of the crude product was adjusted to 12 with 0.5 mL of 0.56 M $NaOH_{(aq)}$, so as to obtain colloidal selenium nanoparticles.

Example 45

In Step (a1), 10 mg of selenium powder (0.126 mmol) and 1 mL of concentrated $HCl_{(aq)}$ were added into a 10 mL two-neck flat-bottomed flask, wherein the selenium powder had an average particle size of 75 μm and the concentrated HCl was 36 wt %. Subsequently, 1 mL of an aqueous solution containing oxidants was added into the flat-bottomed flask, and then the resulting solution was stirred for 20 minutes at 40° C. until the selenium powder was dissolved thoroughly to prepare an aqueous solution containing a selenium precursor. The oxidants were 20 mg of $NaClO_2$ (0.22 mmol) and 60 mg of $NaClO_3$ (0.57 mmol). In Step (a2), 500 mg of citric acid (2.60 mmol) was taken out for use.

In Step (B), the aforementioned citric acid was added into the flat-bottomed flask and mixed with the aqueous solution containing the selenium precursor to form a mixture solution. Subsequently, the flat-bottomed flask was placed on a hot plate and heated at 150° C. for 42 minutes to perform a reduction reaction. The reduction reaction produced a composition containing selenium nanoparticles, residues and gaseous HCl; and the amount of the residues was less than 15% by volume of the above-mentioned mixture solution. During the reduction reaction, the gaseous HCl produced therefrom was guided out through the recovery port attached to the flat-bottomed flask, and was trapped with 10 mL of water in an Erlenmeyer flask for collection.

In Step (C), 50 mL of an aqueous solution including 50 mg of citric acid (0.26 mmol) as the medium was added into the flat-bottomed flask to disperse the selenium nanoparticles in the flat-bottomed flask, and said solution was heated at 70° C. for 10 minutes to obtain colloidal selenium nanoparticles.

Example 46

In Step (a1), 20 mg of selenium powder (0.252 mmol) and 1 mL of concentrated $HCl_{(aq)}$ were added into a 10 mL two-neck flat-bottomed flask, wherein the selenium powder had an average particle size of 75 μm and the concentrated HCl was 36 wt %. Subsequently, 1 mL of an aqueous solution containing oxidants was added into the flat-bottomed flask, and then the resulting solution was stirred for 20 minutes at 25° C. until the selenium powder was dissolved thoroughly to prepare an aqueous solution containing a selenium precursor. The oxidants were 70 mg of $HClO_3$ (0.57 mmol) and 20 mg of $HClO_4$ (0.14 mmol). In Step (a2), 702 mg of glucose (3.90 mmol) was taken out for use.

In Step (B), the aforementioned glucose was added into the flat-bottomed flask and mixed with the aqueous solution containing the selenium precursor to form a mixture solution. Subsequently, the flat-bottomed flask was placed on a hot plate and heated at 150° C. for 42 minutes to perform a reduction reaction. The reduction reaction produced a composition containing selenium nanoparticles, residues and gaseous HCl; and the amount of the residues was less than 15% by volume of the above-mentioned mixture solution. During the reduction reaction, the gaseous HCl produced therefrom was guided out through the recovery port attached to the flat-bottomed flask, and was trapped with 10 mL of water in an Erlenmeyer flask for collection.

In Step (C), 50 mL of an aqueous solution including 100 mg of asparagine (0.76 mmol) as the medium was added into the flat-bottomed flask to disperse the selenium nanoparticles in the flat-bottomed flask, and said solution was heated at 70° C. for 10 minutes to obtain colloidal selenium nanoparticles.

Example 47

In Step (a1), 20 mg of selenium powder (0.252 mmol) and 1 mL of concentrated $HCl_{(aq)}$ were added into a 10 mL two-neck flat-bottomed flask, wherein the selenium powder had an average particle size of 75 μm and the concentrated HCl was 36 wt %. Subsequently, 1 mL of an aqueous solution containing oxidants was added into the flat-bottomed flask, and then the resulting solution was stirred for 20 minutes at 40° C. until the selenium powder was dissolved thoroughly to prepare an aqueous solution containing a selenium precursor. The oxidants were 70 mg of $KBrO_3$ (0.42 mmol) and 30 mg of $HClO_4$ (0.22 mmol). In Step (a2), 234 mg of glucose (1.30 mmol) and 100 mg of PVP with an Mw of 3,500 were taken out for use.

In Step (B), the aforementioned glucose and PVP were added into the flat-bottomed flask and mixed with the aqueous solution containing the selenium precursor to form a mixture solution. Subsequently, the flat-bottomed flask was placed on a hot plate and heated at 150° C. for 42 minutes to perform a reduction reaction. The reduction reaction produced a composition containing selenium nanoparticles, residues and gaseous HCl and a Br-containing gas; and the amount of the residues was less than 15% by volume of the above-mentioned mixture solution. During the reduction reaction, the gaseous HCl and the Br-containing gas produced therefrom were guided out through the recovery port attached to the flat-bottomed flask, and were trapped with 10 mL of water in an Erlenmeyer flask for collection.

In Step (C), 50 mL of water as the medium was added into the flat-bottomed flask to disperse the selenium nanoparticles in the flat-bottomed flask, and said solution was heated at 70° C. for 10 minutes to obtain colloidal selenium nanoparticles.

Characteristic Analyses of Colloidal Selenium Nanoparticles

The colloidal selenium nanoparticles obtained from Comparative Examples 1 and 2 ($C_1$ and $C_2$) and Examples 1 to 47 (E1 to E47) were sequentially analyzed by the test methods as follows.

In order to ensure the experimental significance of the characteristic analyses, aforesaid colloidal selenium nanoparticles were respectively analyzed by the same test methods. Therefore, it could be understood that the difference in characteristics of each of the colloidal selenium nanoparticles was mainly caused by the difference in methods of making the colloidal selenium nanoparticles.

Test 1: Analysis of Optical Properties

The colloidal selenium nanoparticles obtained from the above Examples and Comparative Examples were analyzed with the UV-Vis spectrophotometer.

For every Example and Comparative Example, first, one part of the colloidal selenium nanoparticles was taken, and then an equal volume part of deionized water was added into the part of the colloidal selenium nanoparticles and mixed well to make a diluted sample. After that, each of the diluted samples was measured by the UV-Vis spectrophotometer.

Figure 2:
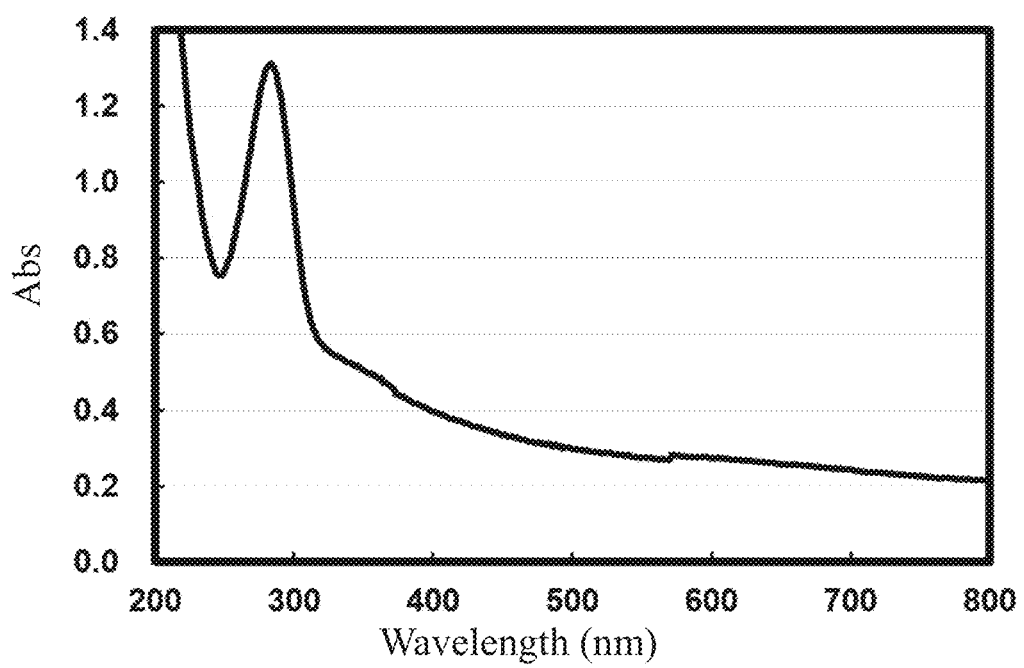
FIG. 2 is the UV-Vis spectrum of the colloidal selenium nanoparticles obtained in Example 32 of the instant disclosure.

As shown in FIG. 2, the UV-Vis spectrum of the diluted sample of Example 32, which was taken as an example, represented that its $\lambda_{max}$ was at a wavelength of 287 nm, and the corresponding optical density (OD value) was 1.357. In addition, the $\lambda_{max}$ values of each of the diluted samples of Examples and Comparative Examples were listed in Table 1. Since all of them respectively had a $\lambda_{max}$ at a wavelength from 280 nm to 290 nm, it demonstrated that those Examples and Comparative Examples indeed obtained colloidal selenium nanoparticles. Besides, the $\lambda_{max}$ values of the colloidal selenium nanoparticles obtained from the Comparative Examples were larger because the average particle sizes thereof were larger.

Test 2: Analysis of Electrochemical Properties

The colloidal selenium nanoparticles obtained from the above Examples and Comparative Examples were analyzed with the Zeta-potential & particle size analyzer.

For every Example and Comparative Example, first, one part of the colloidal selenium nanoparticles was taken, and then an equal volume part of deionized water was added into the part of the colloidal selenium nanoparticles and mixed well to make a diluted sample. After that, each of the diluted samples was measured by the Zeta-potential & particle size analyzer.

Figure 3:
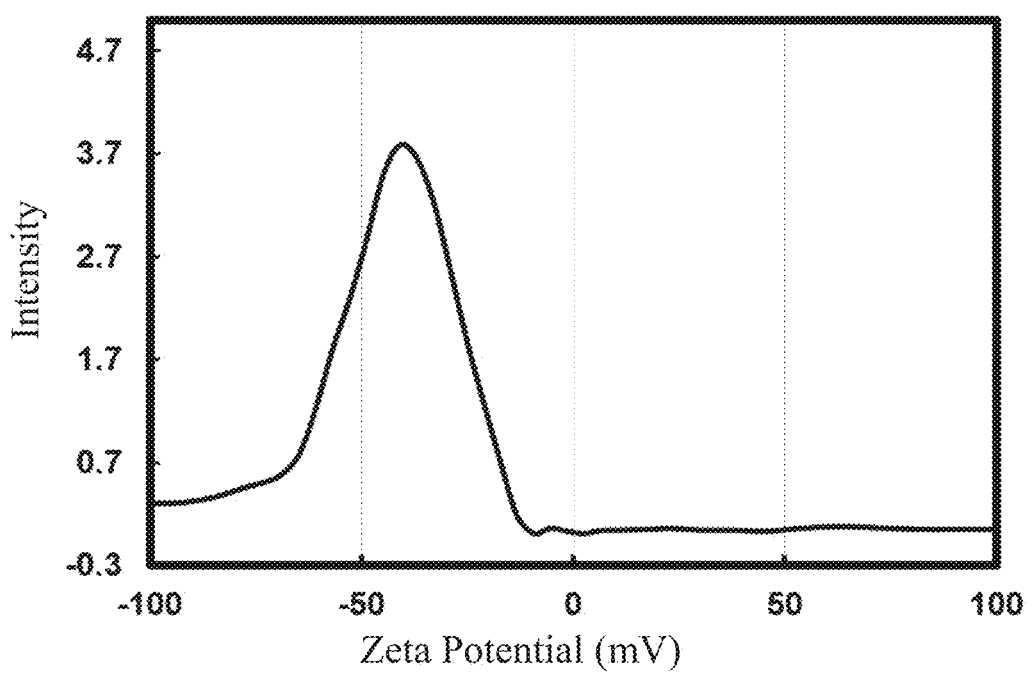
FIG. 3 is the zeta potential diagram of the colloidal selenium nanoparticles obtained in Example 8 of the instant disclosure.

As shown in FIG. 3, the zeta potential diagram of the diluted sample of Example 8, which was taken as an example, represented that its zeta potential was −39.24 mV. In addition, the zeta potential, mobility and conductivity of each of the diluted samples of Examples and Comparative Examples were also listed in Table 1.

Test 3: Analysis of Particle Sizes and Morphology of Colloidal Selenium Nanoparticles Irregular Brownian motion is the random motion of suspended particles, such as colloids in a fluid, which are hit by liquid molecules. Whenever one hit is encountered, the suspended particles change the direction of motion. When the intensity change of the light scattered by the suspended particles is measured, the statistically correlated time can also be obtained. According to the Stokes-Einstein diffusion coefficient equation, the diffusion coefficient of the suspended particles can be obtained, the particle size of each particle can be obtained, the diameter distribution diagram of all particles can be gathered, and a polydispersity index (Pdi) can be calculated. In general, the smaller the Pdi value, the more uniform the particle size distribution.

Figure 4:
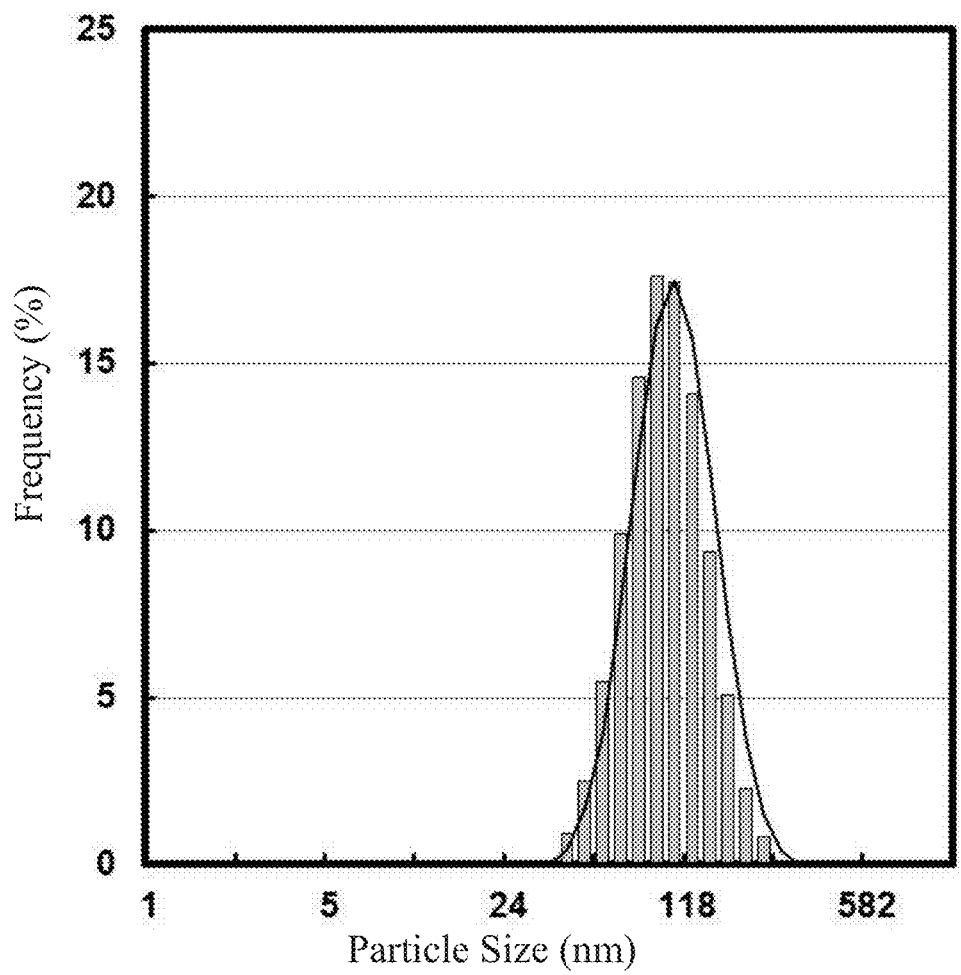
FIG. 4 is the DLS size distribution profile of the colloidal selenium nanoparticles obtained in Example 43 of the instant disclosure.

The particle size distribution of each of the diluted samples of the colloidal selenium nanoparticles were analyzed with the Zeta-potential & particle size analyzer. As shown in FIG. 4, the DLS size distribution profile of the diluted sample of Example 43, which was taken as an example, represented that its concerned average particle size was 93 nm. In addition, the Pdi values of each of the diluted samples of Examples and Comparative Examples were also listed in Table 1. When the Pdi value was 0.33 or less, it indicated that its dimensional uniformity was good.

Figure 5:
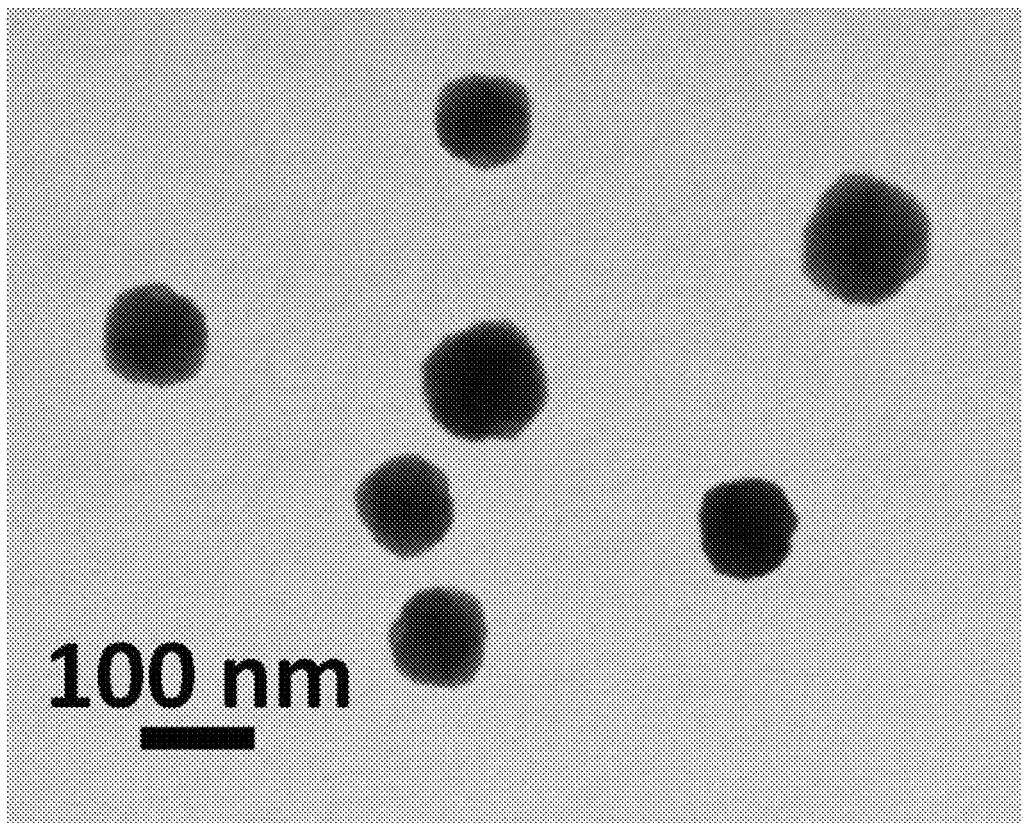
FIG. 5 is the TEM image of the colloidal selenium nanoparticles obtained in Example 4 of the instant disclosure.

Moreover, the morphology of the selenium nanoparticles can also be observed through TEM images. The TEM image shown in FIG. 5 showed that the particle size of the selenium nanoparticles obtained from Example 4 was from 80 nm to 100 nm, and the observation result was consistent with the measurement result by the Zeta-potential & particle size analyzer.

Test 4: Elemental Analysis

The elemental semi-quantitative analyses for each of the colloidal selenium nanoparticles obtained from the above Examples and Comparative Examples were analyzed with the TEM combined with an energy-dispersive X-ray spectroscopy (EDS).

Figure 6:
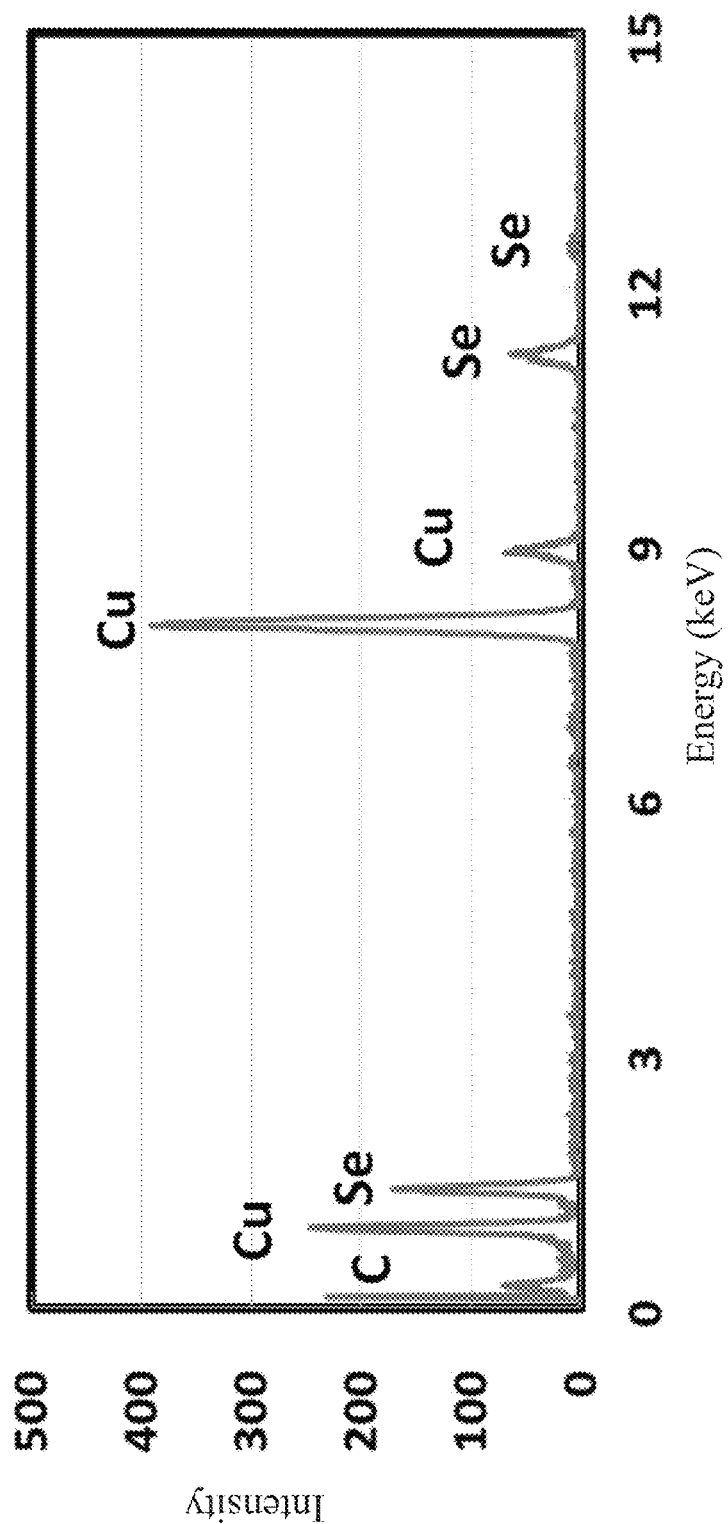
FIG. 6 is the EDS spectrum of the colloidal selenium nanoparticles obtained in Example 35 of the instant disclosure.

As shown in FIG. 6, the EDS analytical result of the colloidal selenium nanoparticles of Example 35, which was taken as an example, represented that except for the C signal peak and Cu signal peak from the carbon-coated copper grid, there was only the Se signal peak in FIG. 6. It demonstrated that the method of the instant disclosure can successfully make colloidal selenium nanoparticles.

In addition, ICP-OES was used to analyze the colloidal selenium nanoparticles obtained from Examples 1 to 47. According to the results, the elements Al, As, Cd, Cr, Cu, Fe, Hg, Pb, Mg, Mn, Ni, and Zn were not detected. It demonstrated that the colloidal selenium nanoparticles obtained from the method of the instant disclosure were non-toxic and safe, therefore very suitable to be applied to cosmetics.

Test 5: Thermogravimetric Analysis (TGA)

Figure 7:
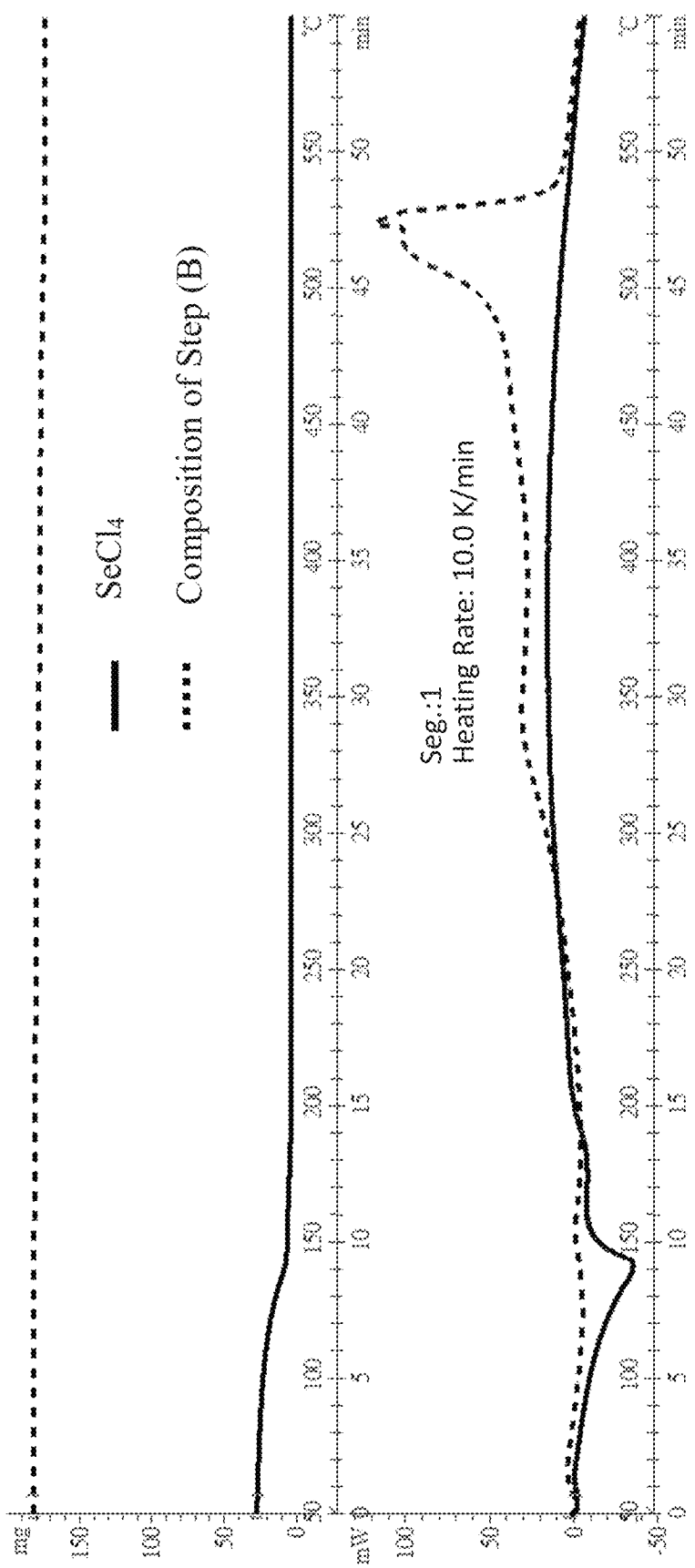
FIG. 7 is the TGA curve diagram of $SeCl_4$ and the composition produced in step (B) in Example 16 of the instant disclosure.

FIG. 7 was the result of thermogravimetric analysis of the composition produced from Step (B) in Example 16. From the upper and lower parts of FIG. 7, $SeCl_4$ represented by the solid line had an obvious endothermic peak at 150° C.; however, the composition represented by the dotted line had no obvious endothermic peak at 150° C.; therefore, it meant that the selenium precursor used in the instant disclosure could completely react without leaving residual selenium precursors.

TABLE 1

| Example No. | UV-Vis $\lambda_{max}$ (nm) | O.D. Value | Zeta potential (mV) | Mobility (cm²/Vs) | Conductivity (ms/cm) | Pdi |
|---|---|---|---|---|---|---|
| E1 | 283 | 1.309 | −28.03 | −2.421 * $10^{-4}$ | 0.4765 | 0.292 |
| E2 | 284 | 1.534 | −39.09 | −6.543 * $10^{-4}$ | 0.3751 | 0.319 |
| E3 | 283 | 1.301 | +3.11 | +2.453 * $10^{-5}$ | 1.4508 | 0.294 |
| E4 | 280 | 1.530 | −40.20 | −3.230 * $10^{-4}$ | 0.3059 | 0.267 |
| E5 | 283 | 1.197 | +33.68 | +2.453 * $10^{-4}$ | 1.9781 | 0.291 |
| E6 | 283 | 1.260 | +26.52 | +2.398 * $10^{-4}$ | 1.9473 | 0.275 |
| E7 | 284 | 1.931 | −32.45 | −2.984 * $10^{-4}$ | 0.4357 | 0.265 |
| E8 | 283 | 1.753 | −39.24 | −3.007 * $10^{-4}$ | 0.3569 | 0.317 |
| E9 | 282 | 2.106 | −39.24 | −3.088 * $10^{-4}$ | 0.3364 | 0.287 |
| E10 | 282 | 1.007 | −34.40 | −2.895 * $10^{-4}$ | 0.3954 | 0.267 |
| E11 | 284 | 1.534 | −39.09 | −2.904 * $10^{-4}$ | 0.3125 | 0.277 |
| E12 | 283 | 1.504 | −13.02 | −8.453 * $10^{-5}$ | 1.2085 | 0.281 |
| E13 | Not detected | | −32.13 | −1.754 * $10^{-4}$ | 0.6011 | 0.278 |
| E14 | 282 | 1.105 | −26.33 | −1.879 * $10^{-4}$ | 0.5934 | 0.305 |
| E15 | 281 | 1.255 | −29.57 | −2.106 * $10^{-4}$ | 0.5019 | 0.298 |
| E16 | 282 | 1.933 | −29.71 | −2.256 * $10^{-4}$ | 0.4982 | 0.311 |
| E17 | 282 | 1.891 | −33.24 | −2.923 * $10^{-4}$ | 0.6785 | 0.301 |
| E18 | 283 | 1.465 | −30.25 | −2.922 * $10^{-4}$ | 0.4599 | 0.267 |
| E19 | 283 | 1.531 | −30.11 | −2.887 * $10^{-4}$ | 0.5321 | 0.273 |
| E20 | 284 | 1.408 | +2.94 | +2.201 * $10^{-5}$ | 1.3687 | 0.310 |
| E21 | 280 | 1.350 | −46.64 | −3.502 * $10^{-4}$ | 0.357 | 0.265 |
| E22 | 220 | 2.98 | −15.68 | −1.014 * $10^{-4}$ | 1.198 | 0.291 |
| E23 | 284 | 1.675 | −29.34 | −2.523 * $10^{-4}$ | 0.6587 | 0.276 |
| E24 | 287 | 8.551 | −28.12 | −2.488 * $10^{-4}$ | 0.7721 | 0.266 |
| E25 | 288 | 7.891 | −27.68 | −2.410 * $10^{-4}$ | 0.6874 | 0.297 |
| E26 | 287 | 8.854 | −28.55 | −2.422 * $10^{-4}$ | 0.6986 | 0.321 |
| E27 | 284 | 1.801 | −14.11 | −9.657 * $10^{-5}$ | 1.365 | 0.266 |
| E28 | 284 | 1.833 | −11.37 | −8.985 * $10^{-5}$ | 1.512 | 0.296 |
| E29 | Not detected | | −35.89 | −3.019 * $10^{-4}$ | 0.4387 | 0.295 |
| E30 | 284 | 1.458 | −10.76 | −7.564 * $10^{-5}$ | 1.209 | 0.264 |
| E31 | 284 | 1.243 | 1.17 | +1.965 * $10^{-5}$ | 1.551 | 0.312 |

TABLE 1-continued

| Example No. | UV-Vis $\lambda_{max}$ (nm) | O.D. Value | Zeta potential (mV) | Mobility (cm²/Vs) | Conductivity (ms/cm) | Pdi |
|---|---|---|---|---|---|---|
| E32 | 283 | 1.357 | −13.4 | −9.549 * 10⁻⁵ | 1.158 | 0.281 |
| E33 | 281 | 1.667 | 2.47 | +8.525 * 10⁻⁵ | 1.549 | 0.277 |
| E34 | 285 | 2.108 | −29.24 | −2.562 * 10⁻⁴ | 0.5324 | 0.277 |
| E35 | 285 | 3.845 | −32.14 | −2.985 * 10⁻⁴ | 0.6788 | 0.259 |
| E36 | 280 | 1.785 | −32.45 | −3.019 * 10⁻⁴ | 0.4658 | 0.275 |
| E37 | 281 | 1.661 | −33.17 | −3.103 * 10⁻⁴ | 0.5578 | 0.276 |
| E38 | 281 | 1.845 | −33.48 | −3.099 * 10⁻⁴ | 0.5542 | 0.288 |
| E39 | 282 | 1.564 | −30.54 | −3.134 * 10⁻⁴ | 0.6540 | 0.320 |
| E40 | 283 | 1.687 | −31.28 | −2.784 * 10⁻⁴ | 0.7066 | 0.316 |
| E41 | 282 | 1.108 | −23.48 | −2.025 * 10⁻⁴ | 0.8823 | 0.277 |
| E42 | 282 | 1.542 | −29.54 | −2.331 * 10⁻⁴ | 0.6783 | 0.267 |
| E43 | 284 | 1.348 | −52.64 | −4.106 * 10⁻⁴ | 0.3004 | 0.209 |
| E44 | 285 | 1.297 | −50.75 | −4.010 * 10⁻⁴ | 0.2938 | 0.240 |
| E45 | 284 | 1.087 | −25.06 | −2.247 * 10⁻⁴ | 0.7245 | 0.247 |
| E46 | 285 | 2.097 | −20.45 | −1.937 * 10⁻⁴ | 0.8915 | 0.254 |
| E47 | 285 | 1.254 | −21.66 | −2.051 * 10⁻⁴ | 0.8245 | 0.307 |
| C1 | 291 | 1.732 | −57.8 | −7.734 * 10⁻⁴ | 0.3045 | 0.343 |
| C2 | 290 | 1.612 | −23.45 | −2.061 * 10⁻⁴ | 0.4548 | 0.354 |

Practical Example 1: Colloidal Selenium Nanoparticles—Fish Scale Collagen Peptides (1) Laboratory Scale Manufacture 10 mL of the colloidal selenium nanoparticles obtained from Example 1 was taken, and 10 mg of fish scale collagen peptides (FSCPs) powder was added into the colloidal selenium nanoparticles, and the resulting solution was stirred at room temperature for 30 minutes to make them mix well, so the selenium nanoparticles and FSCPs were suspended uniformly and dispersedly in the resulting solution. The FSCPs were from Chanos chanos, and contained 91.9 wt % of crude protein and 10.1 wt % of hydroxyproline.

In some embodiments, a weight ratio of the FSCPs relative to the colloidal selenium nanoparticles may be 0.1:99.9 to 3:97, but it is not limited thereto. Preferably, the weight ratio of the FSCPs relative to the colloidal selenium nanoparticles may be 0.1:99.9 to 1:99. More preferably, the weight ratio of the FSCPs relative to the colloidal selenium nanoparticles may be 0.1:99.9 to 0.3:99.7.

(2) Scaling-Up Manufacture

The FSCPs powder was added into 500 mL of the colloidal selenium nanoparticles obtained from Example 1, and the weight ratio of the FSCPs powder relative to the colloidal selenium nanoparticles was 0.3:99.7. The mixed solution was stirred at room temperature for 30 minutes to make them mix well, so the selenium nanoparticles and FSCPs were suspended uniformly and dispersedly in the resulting solution, which appeared as a red clear solution.

When the red clear solution was irradiated by a beam of light, a bright light path was observed, namely the Tyndall effect, so it was proved that the red clear solution was a colloidal solution.

Figure 8:
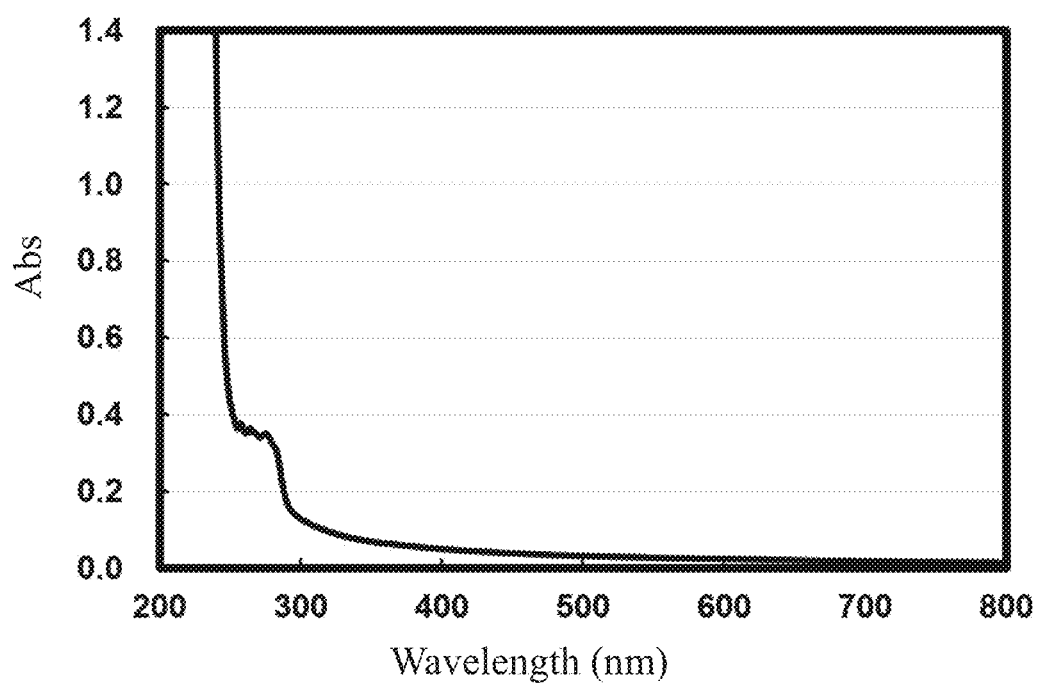
FIG. 8 is the UV-Vis spectrum of the red clear solution prepared by the scaling-up manufacture of Practical Example 1.
Figure 9:
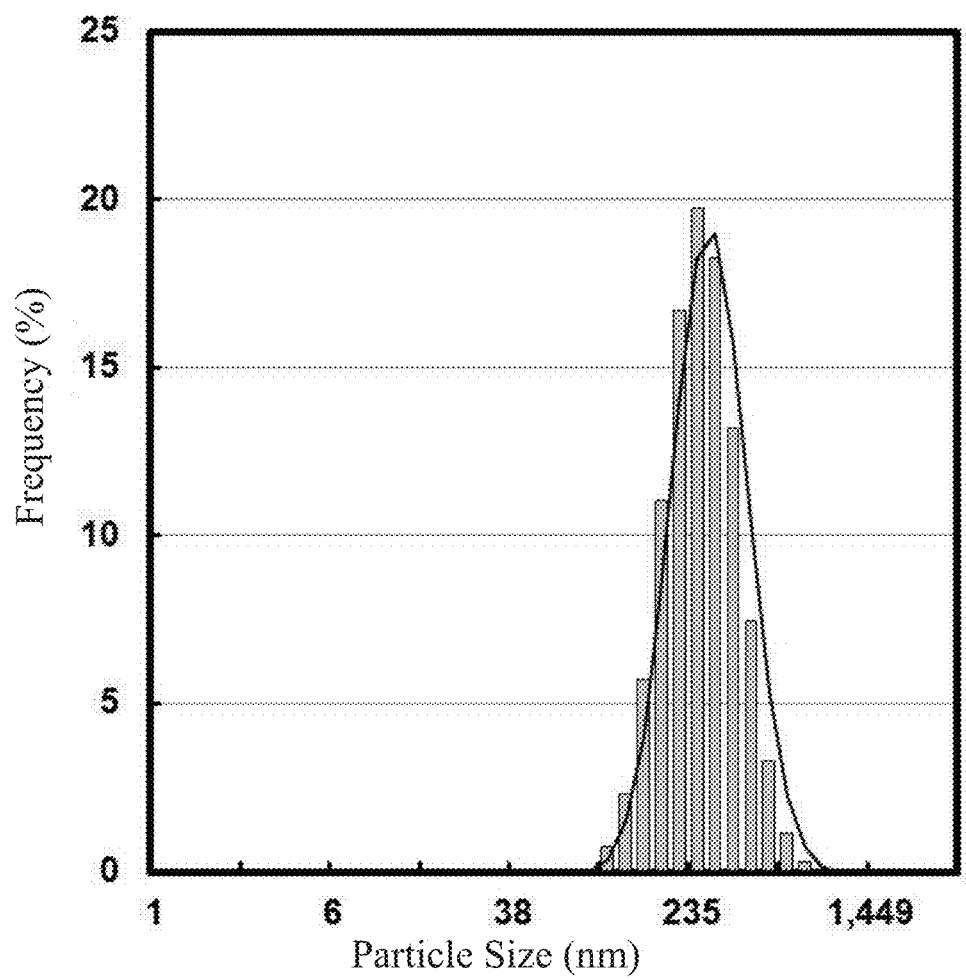
FIG. 9 is the DLS size distribution profile of the red clear solution prepared by the scaling-up manufacture of Practical Example 1.
Figure 10:
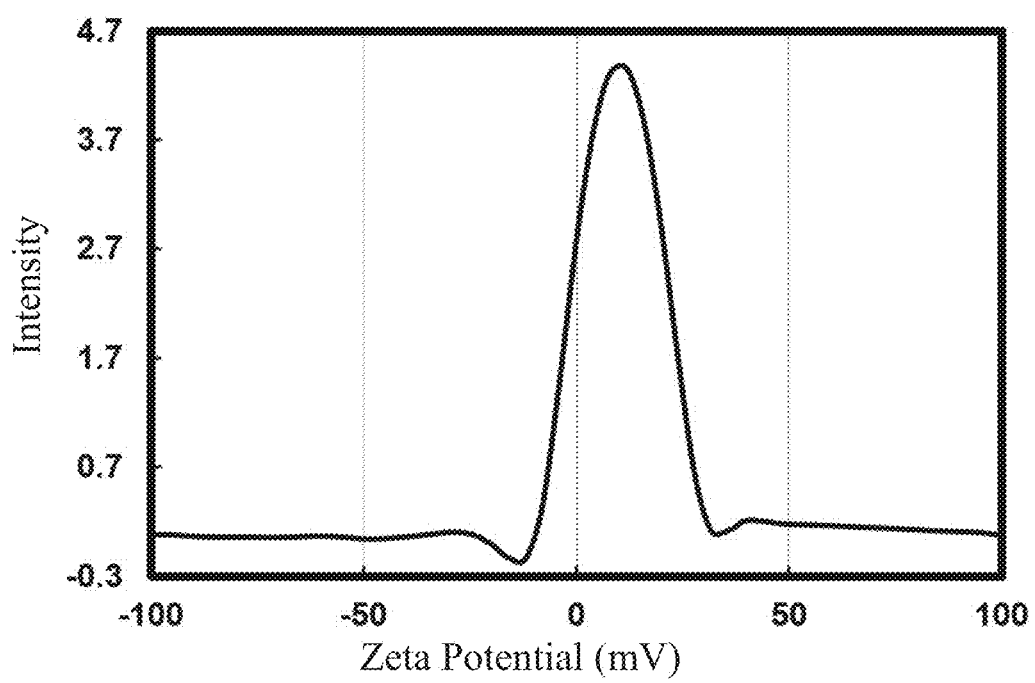
FIG. 10 is the zeta potential diagram of the red clear solution prepared by the scaling-up manufacture of Practical Example 1.
Figure 11:
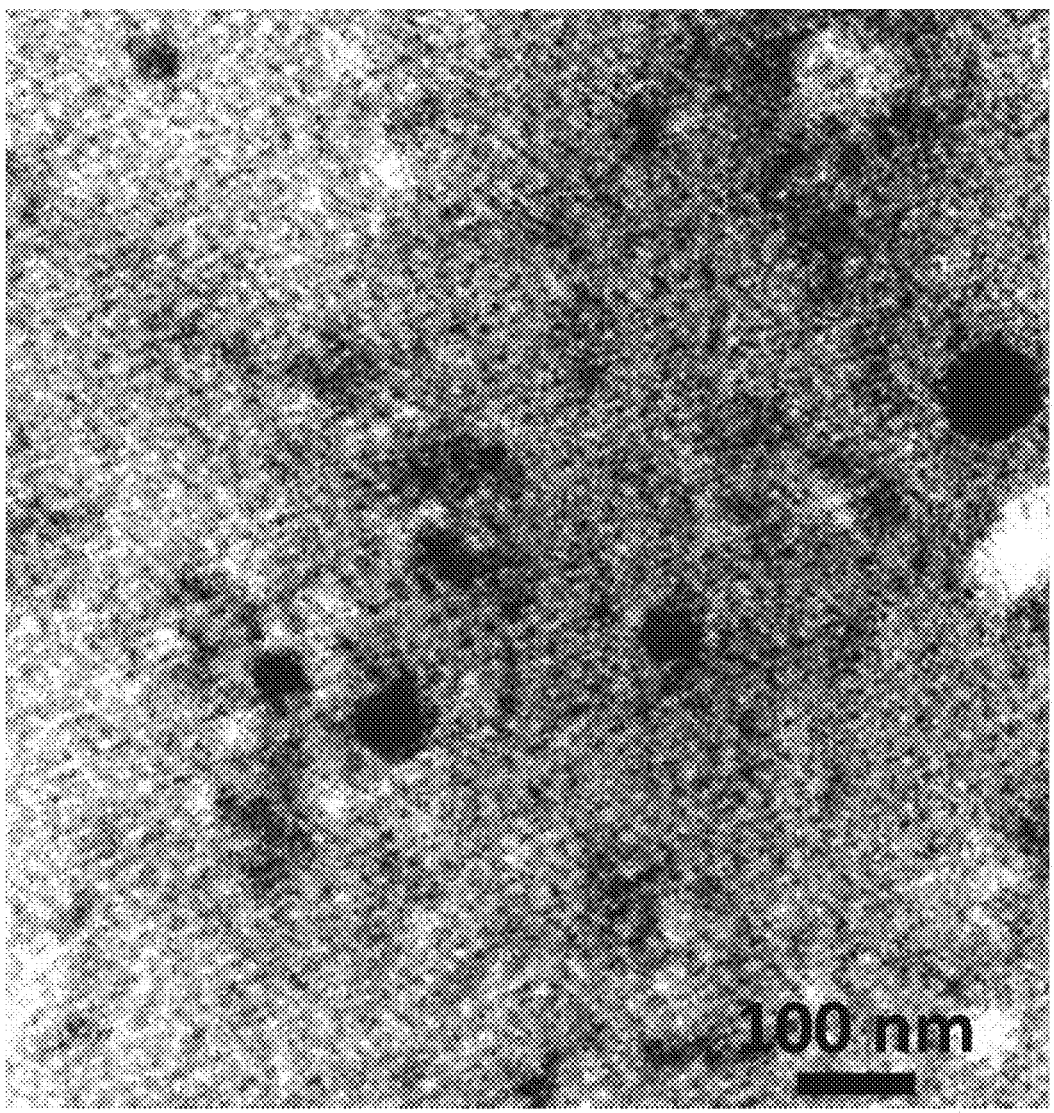
FIG. 11 is the TEM image of the red clear solution prepared by the scaling-up manufacture of Practical Example 1.

Moreover, the UV-Vis spectrum of the red clear solution was shown in FIG. 8; the DLS size distribution profile of the red clear solution was shown in FIG. 9; the zeta potential diagram of the red clear solution was shown in FIG. 10; and the TEM image of the red clear solution was shown in FIG. 11.

The FSCPs had a $\lambda_{max}$ at 281 nm which conformed to the ultraviolet absorption characteristics of collagen, whose main absorption wavelength ranged from about 200 nm to 300 nm.

The colloidal selenium nanoparticles-fish scale collagen peptides can be verified by absorption peak migration, average particle size increase and zeta potential value change. Specifically, when the solution contained only FSCPs, the $\lambda_{max}$ was at a wavelength of 281 nm, while $\lambda_{max}$ of the red clear solution shifted to a wavelength at 285 nm. Moreover, the DLS analytical result also showed that the average particle size of the colloidal selenium nanoparticles-fish scale collagen peptides was 211.5 nm, which was much larger than the average particle size of the colloidal selenium nanoparticles (82 nm). Besides, the zeta potential of the colloidal selenium nanoparticles-fish scale collagen peptides was 11.15 mV while the zeta potential of the colloidal selenium nanoparticles was −28.03 mV. It showed that the FSCPs had been adsorbed on the surface of the selenium nanoparticles and stably dispersed in the colloidal selenium nanoparticles-fish scale collagen peptides.

Practical Example 2: Colloidal Selenium Nanoparticles-Antibody Conjugate (1) Preparation of Colloidal Selenium Nanoparticles-Antibody Conjugate 1 mL of the colloidal selenium nanoparticles obtained from Example 1 was taken and adjusted to a pH value of 8.3. Subsequently, 13.16 μL of human chorionic gonadotropin (hCG) secondary antibody solution was added into the colloidal selenium nanoparticles and mixed for 20 minutes at room temperature; wherein the secondary antibody solution contained 2.268 mg/mL of anti-Beta hCG mAb. Subsequently, 100 μL of 10 wt % of bovine serum albumin (BSA) solution was added and mixed at room temperature for 20 minutes. Then, the resulting solution was cooled to 4° C. and was subjected to a centrifugation at 10,000 rpm for 20 minutes. After a completion of the centrifugation, the supernatant was removed carefully, and 1 mL of wash buffer was added to dissolve the pellet by votexing. The wash buffer comprised 10 wt % of BSA in 10 mM Tris buffer. Then, the resulting solution was subjected again to another centrifugation at 10,000 rpm for 20 minutes at 4° C. After removing the supernatant, 100 μL of resuspension buffer was added to dissolve the pellet by votexing; wherein the resuspension buffer comprised 10 wt % of BSA in 10 mM Tris buffer, 5 wt % of sucrose, and 0.2 wt % of Tween 20. Finally, the colloidal selenium nanoparticles-antibody conjugate was obtained and stored at 4° C.

(2) Preparation of an Immunochromatographic Test Piece

Figure 12:
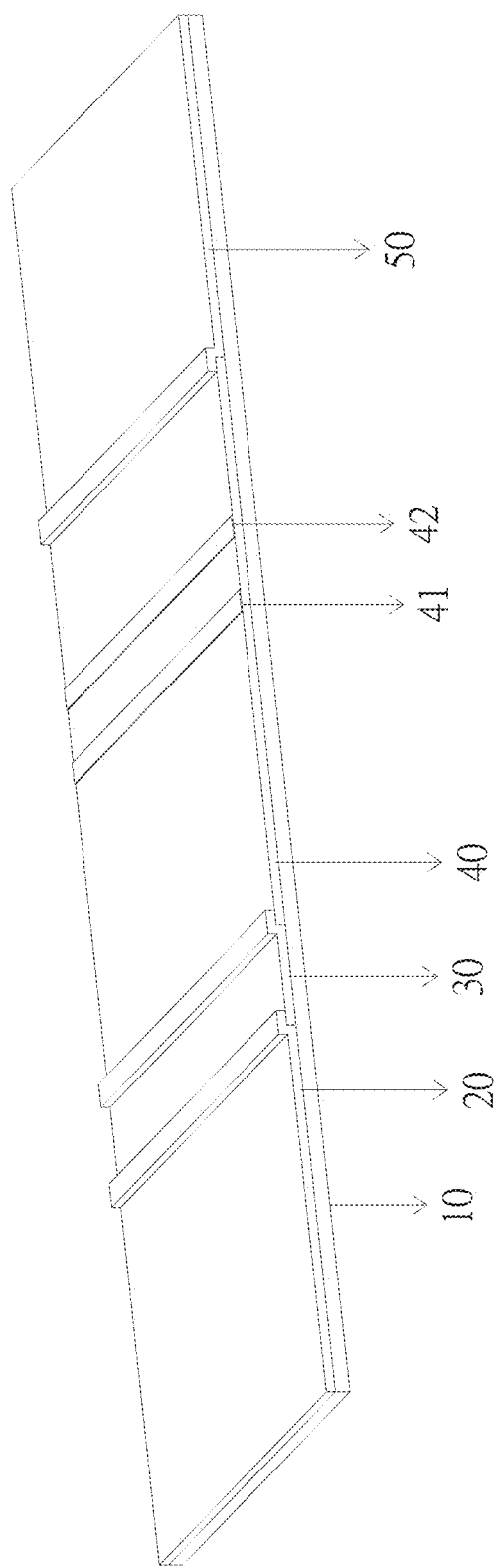
FIG. 12 is a schematic diagram illustrating the immunochromatographic test piece of Practical Example 2.

As shown in FIG. 12, a nitrocellulose membrane 40, a conjugate pad 30, a sample pad 20 and an absorbent pad 50 were sequentially adhered to a backing card 10 to form a laminate. The conjugate pad 30 was first modificially adsorbed with 20 μL of the colloidal selenium nanoparticles-antibody conjugate, and then the laminate was dried in an oven at 37° C. for 5 minutes to 10 minutes, and then it was stored in a moisture-proof box for later use.

Next, 0.5 μL of 1.2 mg/mL of the primary antibody (anti-Alpha hCG mAb) was fixed at 3.4 cm from the end of the nitrocellulose membrane 40 as the test line 41. In addition, 0.5 μL of 1.2 mg/mL of the antibody (AffiniPure Goat Anti-Mouse IgG (H+L)) was fixed at 3.7 cm from the end of the nitrocellulose membrane 40 as the control line 42. Then, the laminate was dried in an oven at 37° C. for 5 minutes to 10 minutes to obtain the immunochromatographic test piece. The immunochromatographic test piece was put into a ziplock bag with a desiccant for storage.

Test 6: Immunoassay Testing

20 μL of 50 μM hCG aqueous solution was taken as the test sample and placed on the sample pad 20 of the above immunochromatographic test piece, and then a phosphate-buffered saline (PBS) was used to elute the test sample. After 3 minutes to 5 minutes, the test result was observed. Both of the test line 41 and the control line 42 appeared orange, which was the color of the selenium nanoparticles.

Test 7: Test for Antimicrobial Activity

First, the colloidal selenium nanoparticles obtained from Example 36 was measured by ICP-OES to determine the concentration of the selenium nanoparticles contained therein, and then a phosphate-buffered saline as a buffer solution was added to prepare each of the test samples as shown in Table 2. The buffer solution contained 137 mM of NaCl, 2.7 mM of KCl, 10 mM of $Na_2HPO_4 \cdot 2H_2O$ and 2.0 mM of $KH_2PO_4$, and had a pH of about 7.4. According to the standard method ASTM E2149, each of the test samples was subjected to an antibacterial test. The test strain used in this test was BCRC 11634 *Escherichia coli* and BCRC 10461 *Staphylococcus aureus*. The test was a quantitative analysis, which mainly calculated the antibacterial rate based on the difference in the number of bacteria before and after 24 hours bacterial culture. The corresponding antibacterial rates of the test samples were listed in Table 2.

TABLE 2

| | Content of the | Antibacterial rate | |
|---|---|---|---|
| Test Sample No. | selenium nanoparticles (ppm) | BCRC 11634 *Escherichia coli* | BCRC 10461 *Staphylococcus aureus* |
| Example 36-1 | 6.7 | 99.6% | 98% |
| Example 36-2 | 13.2 | >99.0% | >99.0% |
| Example 36-3 | 33.3 | >99.0% | >99.0% |
| Example 36-4 | 66.7 | >99.0% | >99.0% |

Discussion of the Results

Compared with the hydrothermal synthesis adopted in Comparative Example 1, the method of Examples 1 to 47 of the instant disclosure did not require any expensive equipment and the process was simple. Therefore, it demonstrated that the instant disclosure indeed had advantages of reducing costs and being beneficial for mass production.

Compared with the closed reflux system adopted in Comparative Example 2 with a single step of simultaneous reduction and dispersion, the method of Examples 1 to 47 of the instant disclosure was deliberately divided into two steps, namely, nanonization and colloidization. Accordingly, the reducing agents and dispersing agents adopted in the instant disclosure can be independently selected from wide choices without any restriction. That is, the instant disclosure can be applied to various technical fields, which is beneficial to commercial implementations.

In addition, from the comparison of Pdi values of Examples 1 to 47 to those of Comparative Examples 1 and 2 in Table 1, the colloidal selenium nanoparticles obtained by the instant disclosure can have a better size uniformity. Among them, the Pdi values of the colloidal selenium nanoparticles obtained by Examples 4, 7, 10, 18, 21, 24, 27, 30, 35, and 42 to 46 were even lower than 0.27. Accordingly, it demonstrated that the colloidal selenium nanoparticles obtained by the instant disclosure have a good quality and stability.

Based on the results of Examples 42 to 47, the instant disclosure can directly convert micro-sized selenium powder into colloidal selenium nanoparticles. It demonstrates that the instant disclosure has the advantage of increasing cost-effectiveness.

By limiting the volume of the mixture solution during the reduction reaction, it is conductive to increase the concentration of the reactants and enhance collision probability of reactant molecules in the reaction vessel, so that the reaction rate can be accelerated. Accordingly, the instant disclosure has advantages of complete reaction, higher yield and improved cost-effectiveness.

Further, by means of guiding the gas such produced from the reduction reaction out of the reaction vessel at the same time, it facilitates acceleration of the forward reaction, and therefore the reaction time for producing selenium nanoparticles can be shortened to within 20 minutes, even to merely 6 minutes. Moreover, faster reaction rate of the reduction reaction will yield a narrower size distribution of selenium nanoparticles. Accordingly, said selenium nanoparticles have a homogeneous size distribution and do not require further filtration, so the yield can be improved.

Furthermore, from the analytical results of ICP-OES, it showed there are no other elements in the colloidal selenium nanoparticles, especially metal impurities, so the method of instant disclosure has the advantages of safety and environmental friendliness.

Even though numerous characteristics and advantages of the instant disclosure have been set forth in the foregoing description, together with details of the structure and features of the disclosure, the disclosure is illustrative only. Changes may be made in the details, especially in matters of shape, size, and arrangement of parts within the principles of the disclosure to the full extent indicated by the broad general meaning of the terms in which the appended claims are expressed.

What is claimed is:

1. A method of making colloidal selenium nanoparticles, comprising steps of:
    Step (A): providing a reducing agent and an aqueous solution containing a selenium precursor;
    Step (B): mixing the aqueous solution containing the selenium precursor and the reducing agent in a reaction vessel to form a mixture solution and heating the mixture solution to undergo a reduction reaction and produce a composition containing selenium nanoparticles, residues and a gas in the reaction vessel, and guiding the gas out of the reaction vessel during the heating; wherein the heating continues until an amount of the residues is less than 20% by volume of the mixture solution; wherein a heating temperature in Step (B) ranges from 50° C. to 200° C.; and Step (C): dispersing the selenium nanoparticles with a medium to obtain the colloidal selenium nanoparticles at a dispersion temperature ranging from 20° C. to 80° C.;

wherein the reducing agent comprises a first reducing agent or a second reducing agent;

wherein the first reducing agent is selected from the group consisting of: citric acid, lactic acid, glycolic acid, ascorbic acid, oxalic acid, tartaric acid, 1,4-butanediol, glycerol, acetaldehyde, monosaccharide, disaccharide and any combination thereof; and the second reducing agent is selected from the group consisting of: poly(ethylene glycol), polyvinylpyrrolidone, polysaccharide and any combination thereof.

2. The method as claimed in claim 1, wherein the selenium precursor of the aqueous solution comprises a selenium halide, a selenium ion, a selenous acid, a selenite ion, a selenate ion or a selenosulfate ion.

3. The method as claimed in claim 1, wherein guiding the gas out of the reaction vessel during the heating in Step (B) comprises guiding the gas produced from the reduction reaction out of the reaction vessel and then trapping the gas with water in a tank.

4. The method as claimed in claim 1, wherein a heating temperature in Step (B) ranges from 70° C. to 160° C.

5. The method as claimed in claim 1, wherein the dispersion temperature in Step (C) ranges from 50° C. to 80° C.

6. The method as claimed in claim 1, wherein a molar concentration of the selenium precursor of the aqueous solution ranges from 0.05 M to 3.0 M.

7. The method as claimed in claim 6, wherein when the reducing agent comprises the first reducing agent, a molar ratio of the first reducing agent relative to the selenium precursor ranges from 1 to 50.

8. The method as claimed in claim 1, wherein Step (A) comprises:

Step (a1): treating a selenium powder with an aqueous solution containing an oxidant to provide the aqueous solution containing the selenium precursor; and Step (a2): providing the reducing agent.

9. The method as claimed in claim 1, wherein the medium in Step (C) comprises water or an aqueous solution including a dispersing agent; wherein the dispersing agent comprises citric acid, lactic acid, poly(lactic acid), ascorbic acid, tannic acid, malic acid, sodium hydroxide, polyarginine, lysine, glutamic acid, asparagine, oleylamine, ethylene glycol, glycerol, glucose, maltose, maltitol, polyvinylpyrrolidone, chitosan, polyvinyl alcohol, poly(ethylene glycol), or any combination thereof.

10. The method as claimed in claim 9, wherein a molar concentration of the dispersing agent ranges from 0.001 M to 1.0 M.

11. The method as claimed in claim 9, wherein a molar ratio of the dispersing agent relative to the selenium nanoparticles ranges from 0.1 to 100.

* * * * *